United States Patent
Inoue et al.

(10) Patent No.: US 7,522,312 B2
(45) Date of Patent: *Apr. 21, 2009

(54) THRESHOLD MATRIX, A METHOD OF GENERATING THE SAME, AND A METHOD OF REPRODUCING COLOR IMAGE

(75) Inventors: Yoshiaki Inoue, Odawara (JP); Fumikazu Kobayashi, Shizuoka-ken (JP); Ikuo Kawauchi, Fujieda (JP)

(73) Assignee: FUJIFILM Corporation, Tokyo (JP)

(*) Notice: Subject to any disclaimer, the term of this patent is extended or adjusted under 35 U.S.C. 154(b) by 697 days.

This patent is subject to a terminal disclaimer.

(21) Appl. No.: 11/071,173

(22) Filed: Mar. 4, 2005

(65) Prior Publication Data

US 2005/0195439 A1 Sep. 8, 2005

(30) Foreign Application Priority Data

Mar. 5, 2004 (JP) .............................. 2004-063184

(51) Int. Cl.
*G06K 15/00* (2006.01)
*H04N 1/405* (2006.01)

(52) U.S. Cl. .................................... 358/3.13; 358/3.06
(58) Field of Classification Search ................. 358/3.13, 358/3.06, 3.01, 1.9, 1.1
See application file for complete search history.

(56) References Cited

U.S. PATENT DOCUMENTS

| | | | |
|---|---|---|---|
| 3,983,319 A | 9/1976 | Moe et al. | |
| 5,315,406 A | 5/1994 | Levien | |
| 5,689,623 A | 11/1997 | Pinard | |
| 5,726,772 A | 3/1998 | Parker et al. | |
| 5,731,884 A | 3/1998 | Inoue | |
| 5,734,759 A | 3/1998 | Hirota et al. | |
| 5,831,626 A * | 11/1998 | Sano et al. | ................... 345/596 |
| 5,832,122 A | 11/1998 | Shimazaki | |
| 5,867,607 A | 2/1999 | Shibuya et al. | |
| 5,943,143 A | 8/1999 | Kawai et al. | |
| 6,101,002 A | 8/2000 | Urasawa | |

(Continued)

FOREIGN PATENT DOCUMENTS

JP 61-248661 11/1986

(Continued)

OTHER PUBLICATIONS

European Search Report dated Jul. 30, 2007.
J. Sullivan, "Design of Minimum Visual Modulation Halftone Patterns", IEEE Transactions on Systems, Man and Cybernetics, Jan./Feb. 1991 pp. 33-38, , vol. 21, No. 1.

(Continued)

*Primary Examiner*—Mark K Zimmerman
*Assistant Examiner*—Ming Hon
(74) *Attorney, Agent, or Firm*—Sughrue Mion, PLLC

(57) ABSTRACT

A dot pattern with a plurality of pixels representing a two-dimensional image is formed on a printing plate material by applying laser beams, which are turned on and off for each pixel depending on dot pattern data, to the printing plate material in a main scanning direction, while the laser beams are moved in an auxiliary scanning direction that is orthogonal to the main scanning direction. A threshold matrix having an array of thresholds is obtained for generating a dot where the degree of a variation of the dot periphery length in a main scanning direction is smaller, i.e., a dot where the dot periphery length in the main scanning direction has a smaller standard deviation.

11 Claims, 23 Drawing Sheets

U.S. PATENT DOCUMENTS

| | | | |
|---|---|---|---|
| 6,172,770 B1 | 1/2001 | Inoue | |
| 6,288,795 B1 | 9/2001 | Urasawa | |
| 6,335,989 B1 | 1/2002 | Lin | |
| 6,493,112 B1 | 12/2002 | Arce et al. | |
| 6,573,917 B2 | 6/2003 | Sadka | |
| 6,714,320 B1 * | 3/2004 | Nakahara et al. | 358/3.13 |
| 6,798,537 B1 * | 9/2004 | Lau et al. | 358/1.9 |
| 6,813,044 B2 | 11/2004 | Rylander | |
| 6,906,825 B1 | 6/2005 | Nakahara et al. | |
| 6,934,054 B1 | 8/2005 | Hilsdorf et al. | |
| 6,943,808 B2 | 9/2005 | Hains et al. | |
| 7,245,402 B2 | 7/2007 | McCrea et al. | |
| 2001/0012129 A1 | 8/2001 | Inoue | |
| 2001/0013941 A1 | 8/2001 | Ogiyama et al. | |
| 2002/0186418 A1 | 12/2002 | Inoue | |
| 2003/0053085 A1 | 3/2003 | Takemoto | |
| 2003/0081258 A1 | 5/2003 | Sugizaki | |
| 2003/0107768 A1 | 6/2003 | Crounse | |
| 2003/0218780 A1 | 11/2003 | Braun et al. | |
| 2004/0114168 A1 | 6/2004 | Kuiper | |
| 2005/0195440 A1 | 9/2005 | Inoue | |
| 2005/0195441 A1 | 9/2005 | Inoue et al. | |
| 2005/0195442 A1 | 9/2005 | Inoue et al. | |
| 2006/0164698 A1 | 7/2006 | Kurumisawa | |
| 2006/0164699 A1 | 7/2006 | Inoue | |
| 2006/0221400 A1 | 10/2006 | Sugizaki | |
| 2007/0127837 A1 | 6/2007 | Ishii | |

FOREIGN PATENT DOCUMENTS

| | | |
|---|---|---|
| JP | 62-044744 | 2/1987 |
| JP | 64-044583 A | 2/1989 |
| JP | 02-202174 A | 8/1990 |
| JP | 7-285275 A | 10/1995 |
| JP | 8-265566 A | 11/1996 |
| JP | 2001-028685 A | 1/2001 |
| JP | 2001-292317 A | 10/2001 |
| JP | 2002-368995 A | 12/2002 |
| JP | 2002-369005 A | 12/2002 |
| JP | 3400316 B2 | 2/2003 |
| JP | 2003-143405 A | 5/2003 |
| JP | 2003-152999 A | 5/2003 |
| JP | 2003-204433 A | 7/2003 |
| JP | 2004-015410 A | 1/2004 |
| WO | WO 02/065755 A1 | 8/2002 |

OTHER PUBLICATIONS

Dalton, John C., "Perception of Binary Texture and the Generation of Stochastic Halftone Screens", Proc. SPIE, vol. 2411, pp. 207-220, 1995.

Ross, John C., "The Image Processing Handbook, 3$^{rd}$ Edition, CRC Press, 1999, pp. 341-342".

* cited by examiner

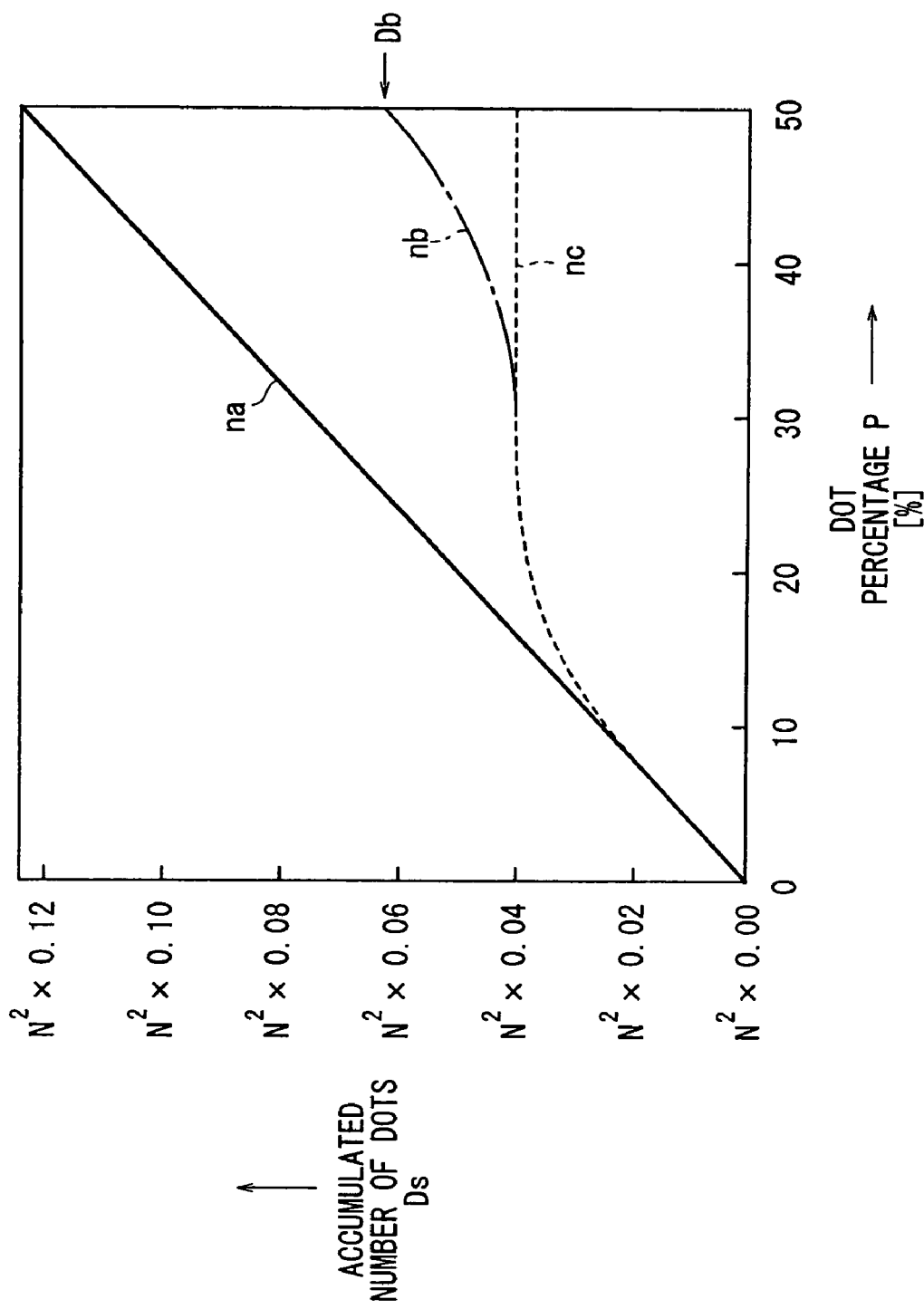

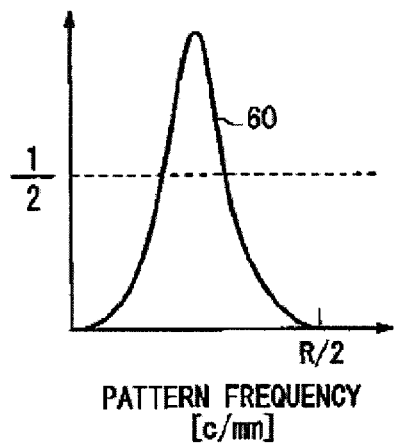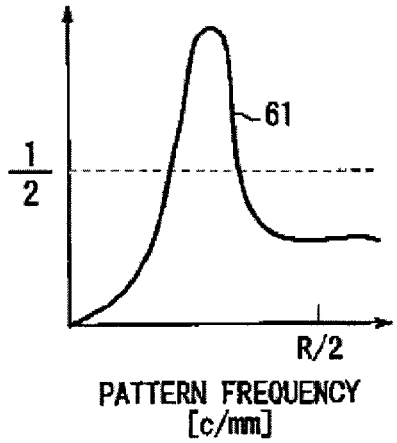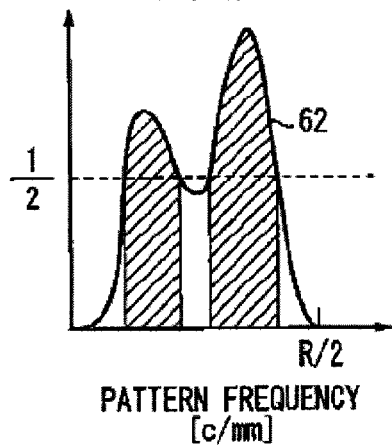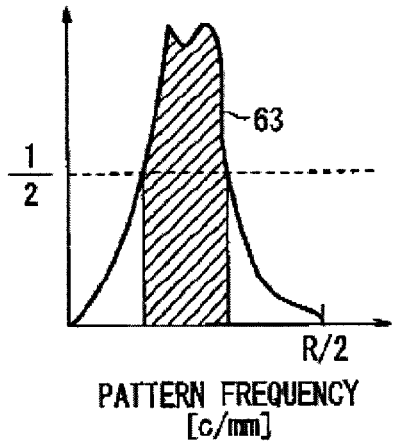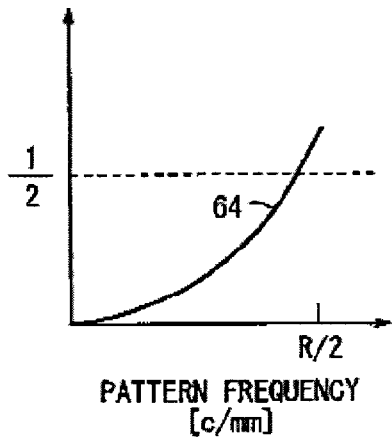

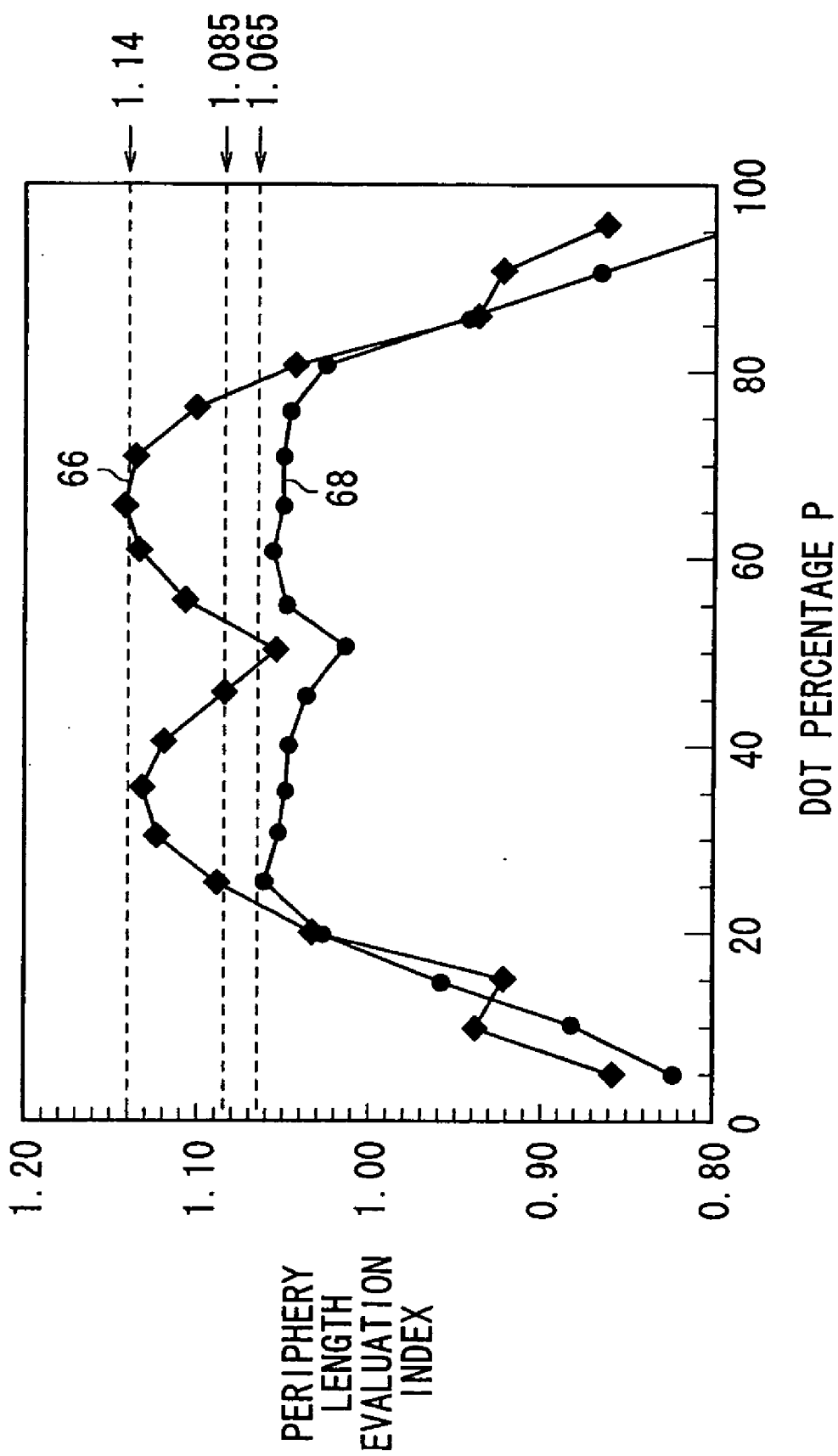

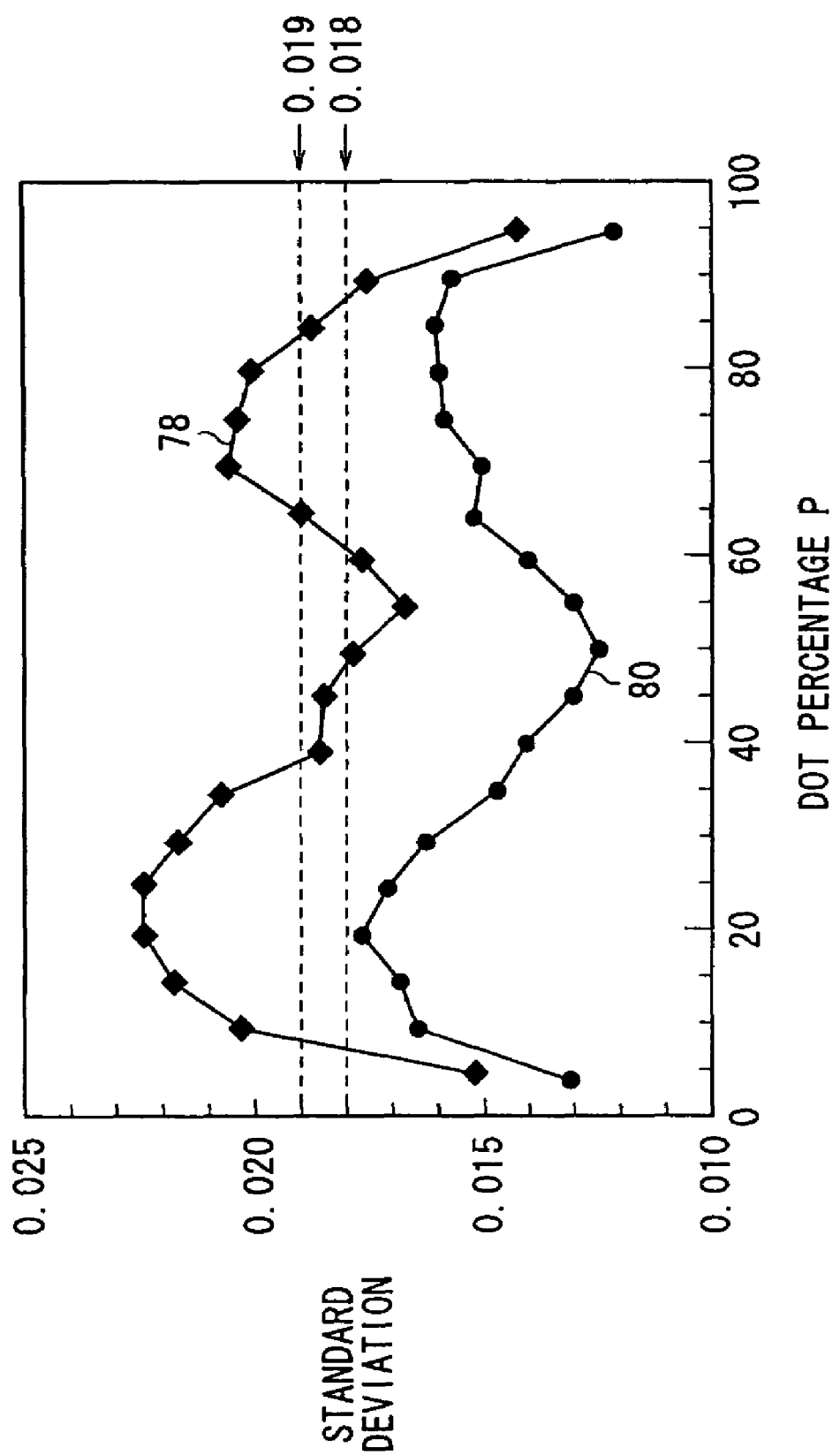

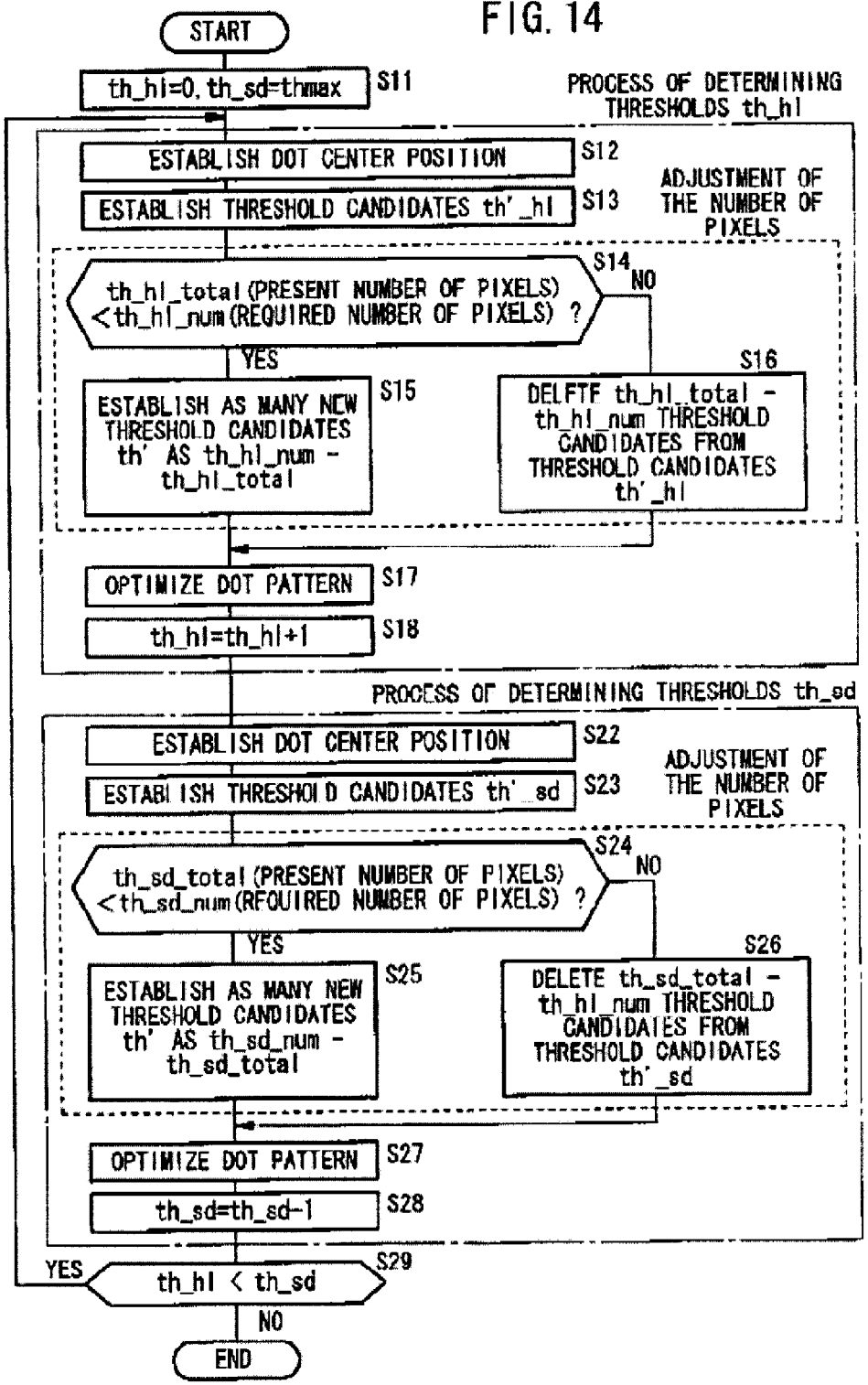

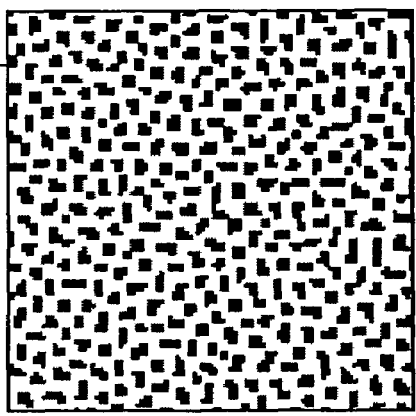 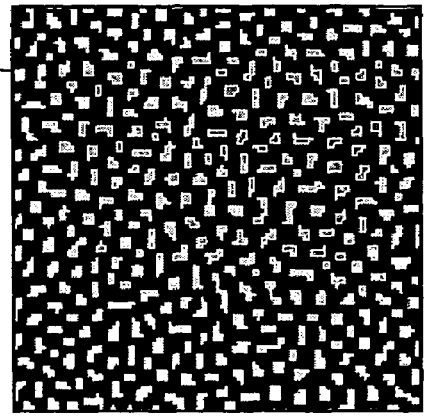
FIG. 19A (10%) 131   FIG. 19D (40%) 134
FIG. 19B (20%) 132   FIG. 19E (50%) 135
FIG. 19C (30%) 133   FIG. 19F (70%) 137

THRESHOLD MATRIX, A METHOD OF GENERATING THE SAME, AND A METHOD OF REPRODUCING COLOR IMAGE

BACKGROUND OF THE INVENTION

1. Field of the Invention

The present invention relates to a threshold matrix and a method of generating such a threshold matrix, for generating a screen which is called an FM screen or a stochastic screen for converting a continuous-tone image into a dot pattern representative of a binary image. More particularly, the present invention relates to a threshold matrix, a method of generating such a threshold matrix, and a method of reproducing a color image that are suitable for use in a printing-related apparatus (output system) such as a filmsetter, a platesetter, a CTP (Computer To Plate) apparatus, a CTC (Computer To Cylinder) apparatus, a DDCP (Direct Digital Color Proof) system, etc., an ink jet printer, or an electrophotographic printer.

2. Description of the Related Art

Heretofore, so-called AM (Amplitude Modulation) screens characterized by screen ruling, screen angle, and dot shape, and FM (Frequency Modulation) screens have been used in the art of printing.

A process of generating a threshold matrix for FM screens is disclosed in Japanese Laid-Open Patent Publication No. 8-265566.

According to the disclosed process, an array of elements of a threshold matrix, i.e., an array of thresholds, is generated in an ascending order or a descending order by determining threshold positions such that the position of an already determined threshold is spaced the greatest distance from the position of a threshold to be newly determined. The dot pattern of a binary image that is generated using the threshold matrix thus produced has dots which are not localized. Even when a dot pattern is generated using a plurality of such threshold matrixes that are juxtaposed, the dot pattern does not suffer a periodic pattern produced by the repetition of threshold matrixes.

A plurality of patent documents given below are relevant to the generation of a threshold matrix.

Japanese Patent No. 3400316 discloses a method of correcting halftone image data by extracting a pixel having a weakest low-frequency component of a certain dot pattern, from white pixels (unblackened pixels), and a pixel having a strongest low-frequency component of the dot pattern, from blackened pixels, and switching around the extracted white and blackened pixels. Thus, the dot pattern is intended to be smoothed or leveled.

Japanese Laid-Open Patent Publication No. 2001-292317 reveals a process of determining threshold positions in a threshold matrix such that a next blackened pixel is assigned to a position having a weakest low-frequency component of the threshold matrix.

Japanese Laid-Open Patent Publication No. 2002-368995 shows a process of determining threshold positions in a threshold matrix such that when an array of thresholds in the threshold matrix has been determined up to a certain gradation and a threshold position for a next gradation is to be determined, blackened pixels are assigned to positions for not strengthening a low-frequency component.

Japanese Laid-Open Patent Publication No. 2002-369005 discloses a process of generating a threshold matrix according to the process shown in Japanese Patent No. 3400316, Japanese Laid-Open Patent Publication No. 2001-292317 and Japanese Laid-Open Patent Publication No. 2002-368995, based on an ideal dot pattern at a certain gradation which is given.

When an FM screen is used for offset printing, it causes shortcomings in that the quality of printed images suffers some graininess. FM screens also cause disadvantages in that a dot gain tends to become large and images are reproduced unstably when images are printed, or when films are output in an intermediate printing process, or when a printing plate is output by a CTP apparatus.

According to the conventional FM screening process, when a dot size is determined to be the size of a dot made up of one pixel or a dot made up of four pixels according to a 1 (1×1)-pixel FM screen or a 4 (2×2)-pixel FM screen, an array of thresholds of a threshold matrix is determined by an algorithm for generating FM screens, thus determining an output quality, and only the dot size serves as a parameter for determining the quality of FM screens. For example, if a dot size is determined to be a 3×3-pixel FM screen dot size with respect to an output system which is incapable of stably reproducing 2×2-pixel FM screen dots for highlight areas, then the resolution (referred to as pattern frequency or pattern resolution) for intermediate tones is lowered, resulting in a reduction in the quality of images.

FIG. 21 of the accompanying drawings shows a conventional dot pattern 1 in a highlight area where the dot percentage of a 2×2-pixel FM screen is 5%, a conventional dot pattern 2 in an intermediate tone area where the dot percentage of the 2×2-pixel FM screen is 50%, a conventional dot pattern 3 in a highlight area where the dot percentage of a 3×3-pixel FM screen is 5%, and a conventional dot pattern 4 in an intermediate tone area where the dot percentage of the 3×3-pixel FM screen is 50%.

FIG. 22 of the accompanying drawings shows a power spectrum generated when the dot pattern 2 of the 2×2-pixel FM screened shown in FIG. 21 is FFTed (Fast-Fourier-Transformed), and FIG. 23 of the accompanying drawings shows a power spectrum generated when the dot pattern 4 of the 3×3-pixel FM screen shown in FIG. 21 is FFTed.

In FIG. 21, at the dot percentage of 50% in the intermediate tone area, the dot pattern 2 of the 2×2-pixel FM screen suffers less graininess than the dot pattern 4 of the 3×3-pixel FM screen, but has the dot percentage less reproducible in the printed image. On the other hand, at the dot percentage of 50% in the intermediate tone area, the dot pattern 4 of the 3×3-pixel FM screen has a pattern frequency 6 of about 13 c/mm which is lower than the pattern frequency 5 of about 20 c/mm of the dot pattern 2 of the 2×2-pixel FM screen. The pattern frequencies 5, 6 which are of peak values are also called a peak spatial frequency fpeak.

The output resolution of an output system such as an imagesetter, a CTP apparatus, etc. (the output resolution of an output system will hereinafter be referred to as output resolution R) is set to 2540 pixels/inch=100 pixels/mm or 2400 pixels/inch=94.488 pixels/mm, for example. With those settings, the dot size of the 1×1 pixel FM screen is 10 μm×10 μm (10.6 μm×10.6 μm), and the dot size of the 2×2 pixel FM screen is 20 μm×20 μm (21.2 μm×21.2 μm). In this description, the output resolution R is different from the pattern frequencies 5, 6 of the dot patterns 2, 4 shown in FIGS. 22, 23.

As described above, only the dot size is a parameter for determining the quality of conventional FM screens.

It is considered in this connection that the conventional FM screens have a greater periphery length (to be described in detail later on) than the AM screens at the same dot percentage.

SUMMARY OF THE INVENTION

It is an object of the present invention to provide a threshold matrix and a method of generating the same that will solve the problems of the conventional FM screens. The generated threshold matrix is optimum for use with an output system, and can reproduce high-quality images of excellent printability.

Another object of the present invention is to provide a threshold matrix and a method of generating the same, in which the periphery length of dots can be reduced with respect to the resolution of a dot pattern in an intermediate tone area.

According to the present invention, there is provided a method of generating a threshold matrix for converting a continuous-tone image into a dot pattern representing a binary image, the method comprising the steps of: defining a reference periphery length proportion per unit area of the dot pattern in which square dots are equally arranged as $Ref\_sur = (4 \times r \times Q^{1/2})/R$ where r represents a pattern frequency, Q represents a blackened ratio, and R represents an output resolution; determining a periphery length proportion per unit area for the dot pattern generated by the threshold matrix corresponding to the blackened ratio Q as Mes_sur; defining a dot pattern periphery length evaluation index as Mes_sur/Ref_sur; and determining a threshold array of the threshold matrix such that the dot pattern periphery length evaluation index is small.

In the invention, a reference periphery length proportion per unit area of the dot pattern in which square dots are equally arranged is defined as Ref_sur where r represents a pattern frequency, Q represents a blackened ratio, and R represents an output resolution; a periphery length proportion per unit area for the dot pattern generated by the threshold matrix corresponding to the blackened ratio Q is determined as Mes_sur; a dot pattern periphery length evaluation index is defined as Mes_sur/Ref_sur; and a threshold array of the threshold matrix is determined such that the dot pattern periphery length evaluation index is small. Thus, the dot pattern representative of a binary image that is obtained by the threshold matrix is optimum for use with an output system, and can reproduce high-quality images of excellent printability. Also, a periphery length of dots can be reduced with respect to the resolution of a dot pattern in an intermediate tone area.

In this case, it is preferable that the threshold array of the threshold matrix is determined such that the dot pattern periphery length evaluation index is less than 1.085 for all blackened ratios Q ranging from 0 to 1. Further, it is much preferable the threshold array of the threshold matrix is determined such that the dot pattern periphery length evaluation index is less than 1.065.

According to the present invention, there is provided a method of generating a threshold matrix for converting a continuous-tone image into a dot pattern representing a binary image, the method comprising the step of: determining a threshold array of the threshold matrix such that a variation of periphery length ratios of a dot pattern in a main scanning direction is small. Thus, the dot pattern is optimum for use with an output system, and can reproduce high-quality images of excellent printability.

Further, it is preferable that the threshold array of the threshold matrix is determined such that a standard deviation of the peripheral length ratios of the dot pattern in the main scanning direction is less than 0.019 for all blackened ratios Q ranging from 0 to 1. It is much preferable that the threshold array of the threshold matrix is determined such that a standard deviation of the peripheral length ratios of the dot pattern in the main scanning direction is less than 0.018.

According to the present invention, there is provided a threshold matrix for converting a continuous-tone image into a dot pattern representing a binary image, wherein when a reference periphery length proportion per unit area of the dot pattern in which square dots are equally arranged is defined as $Ref\_sur = (4 \times r \times Q^{1/2})/R$ where r represents a pattern frequency, Q represents a blackened ratio, and R represents an output resolution, a periphery length proportion determined per unit area for the dot pattern generated by the threshold matrix corresponding to the blackened ratio Q is represented by Mes_sur, a threshold array of the threshold matrix is determined such that a dot pattern periphery length evaluation index defined as Mes_sur/Ref_sur is less than 1.085 for all blackened ratios Q ranging from 0 to 1.

According to the present invention, there is provided a threshold matrix for converting a continuous-tone image into a dot pattern representing a binary image, wherein a threshold array of the threshold matrix is determined such that a standard deviation of peripheral length ratios of the dot pattern in the main scanning direction is less than 0.019 for all blackened ratios Q ranging from 0 to 1.

According to the present invention, there is provided a method of generating a threshold matrix for converting a continuous-tone image into a dot pattern representing a binary image, the method comprising the steps of: defining a reference periphery length proportion per unit area of the dot pattern in which square dots are equally arranged as $Ref\_sur = (4 \times r \times Q^{1/2})/R$ where r represents a pattern frequency, Q represents a blackened ratio, and R represents an output resolution; determining a periphery length proportion per unit area for the dot pattern generated by the threshold matrix corresponding to the blackened ratio Q as Mes_sur; defining a dot pattern periphery length evaluation index as Mes_sur/Ref_sur; and determining a threshold array of the threshold matrix such that the dot pattern periphery length evaluation index is small and that a variation of periphery length ratios of the dot pattern in a main scanning direction is small.

According to the present invention, there is provided a method of reproducing a color image by at least four dot patterns, each of the dot patterns comprising a binary image, at least one of the dot patterns being obtained by using a threshold matrix to convert a continuous-tone image into a dot pattern representative of a binary image. As four printing plates, C, M, Y, K colors are respectively used, for example. It is preferable to use K printing plate, which generally stands out, for at least one of four colors. Alternatively, M or C printing plate may be used depending on use of color. Generally, Y printing plate is not often selected since it is not conspicuous.

According to the present invention, a threshold matrix and a method of generating the same are provided, which are optimum for use with an output system and can reproduce high-quality images of excellent printability.

Further, according to the present invention, the periphery length of dots can be reduced with respect to the resolution of a dot pattern in an intermediate tone area.

Specifically, the threshold matrix is capable of generating an image where dots are reliably assigned to a highlight area, and grainness is reduced and a dot gain is small in an intermediate tone area.

The threshold matrix is stored as data in a storage unit.

The storage unit which stores the threshold matrix as data is incorporated in a raster image processor.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4 is a diagram showing the number of dots vs. dot percentage;

FIG. 7A is a diagram showing a pattern frequency curve having a single peak;

FIG. 7B is a diagram showing another pattern frequency curve having a single peak;

FIG. 7C is a diagram showing a pattern frequency curve having two peaks;

FIG. 7D is a diagram showing another pattern frequency curve having two peaks;

FIG. 7E is a diagram showing a pattern frequency curve without peaks;

FIG. 8 is a diagram showing periphery length evaluation indexes for dot patterns generated by the conventional threshold matrix and the threshold matrix according to the present embodiment;

FIG. 13 is a diagram showing, by way of comparison, the standard deviation of the periphery length ratio of the dot pattern according to the embodiment and the standard deviation of the periphery length ratio of the conventional dot pattern;

FIG. 14 is a flowchart of a detailed sequence of a threshold position determining process in step S4 of the overall sequence shown in FIG. 2;

FIG. 19A is a diagram showing a dot pattern having a dot percentage of 10% which is generated by the threshold matrix according to the embodiment;

FIG. 19B is a diagram showing a dot pattern having a dot percentage of 20% which is generated by the threshold matrix according to the embodiment;

FIG. 19C is a diagram showing a dot pattern having a dot percentage of 30% which is generated by the threshold matrix according to the embodiment;

FIG. 19D is a diagram showing a dot pattern having a dot percentage of 40% which is generated by the threshold matrix according to the embodiment;

FIG. 19E is a diagram showing a dot pattern having a dot percentage of 50% which is generated by the threshold matrix according to the embodiment;

FIG. 19F is a diagram showing a dot pattern having a dot percentage of 70% which is generated by the threshold matrix according to the embodiment;

DESCRIPTION OF THE PREFERRED EMBODIMENTS

Figure 1:
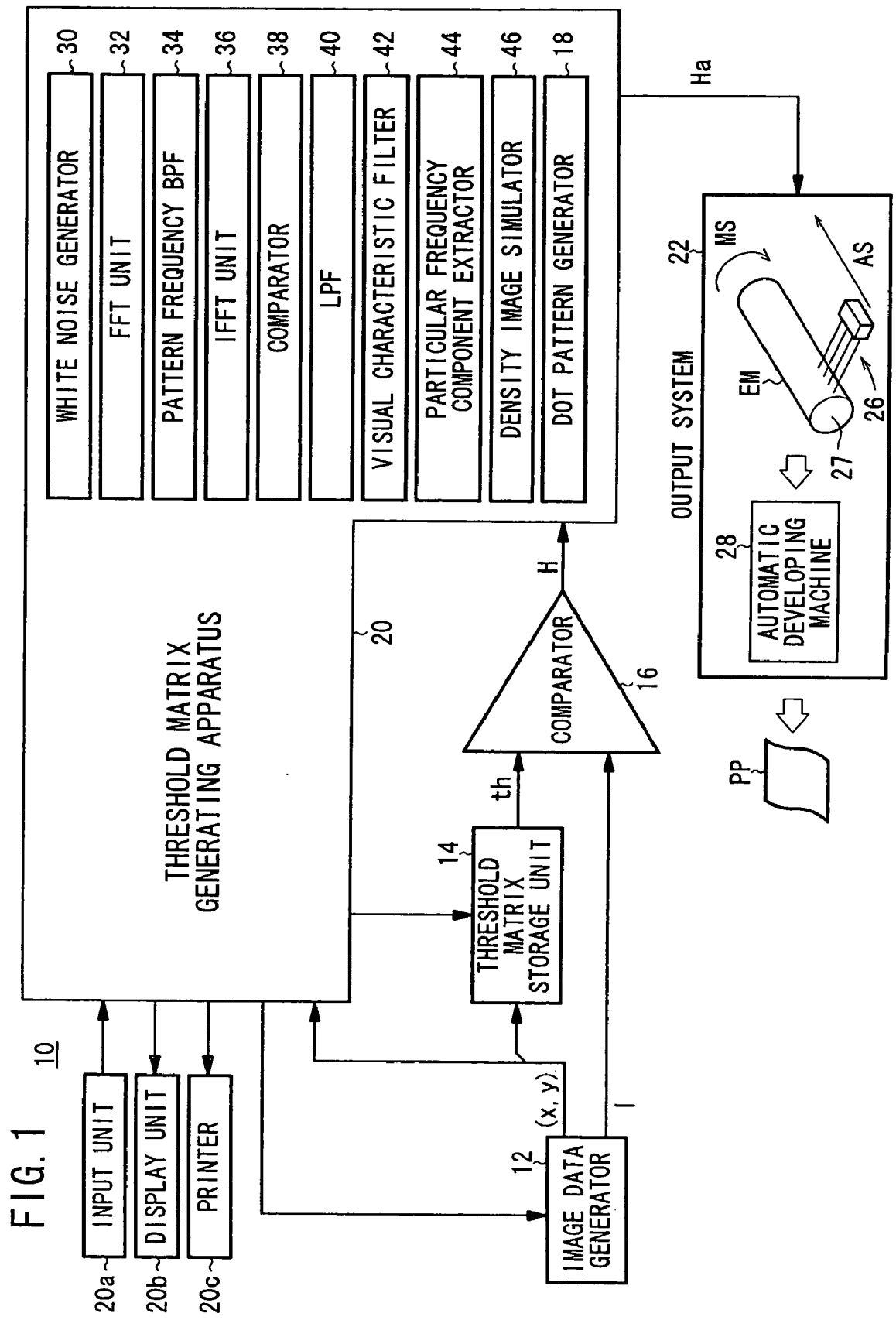
FIG. 1 is a block diagram of a threshold matrix generating system to which a process of generating a threshold matrix according to an embodiment of the present invention is applied.

FIG. 1 shows a basic arrangement of a threshold matrix generating system 10 according to an embodiment to which a method of generating a threshold matrix and a method of reproducing a color image of the present invention are applied.

As shown in FIG. 1, the threshold matrix generating system 10 has an image data generator 12 for generating image data I including a test pattern of uniform density and also generating a two-dimensional address (x, y) of the image data I, a threshold matrix storage unit 14 for storing a plurality of threshold matrixes TM and outputting a threshold th read by the address (x, y), a comparator 16 for comparing the threshold th and the image data I and outputting binary image data H, a threshold matrix generating apparatus 20 including a dot pattern generator 18 for generating dot pattern data Ha corresponding to the binary image data H output from the comparator 16, the threshold matrix generating apparatus 20 serving to determine a threshold array (threshold positions) of the threshold matrixes TM such that a dot pattern represented by the dot pattern data Ha will be a desired dot pattern, and an output system 22 for forming the dot pattern corresponding to the dot pattern data Ha on a film, a printing plate PP, or a printed material.

The threshold matrix storage unit 14 comprises a recording medium such as a hard disk or the like. The image data generator 12, the comparator 16, the dot pattern generator 18, and the threshold matrix generating apparatus 20 may comprise function realizing means that are achieved when a program stored in a personal computer (including a CPU, a memory, an input unit 20a such as a keyboard, a mouse, etc., and an output unit such as a display unit 20b, a printer 20c, etc.) is executed by the computer. The function realizing means of the threshold matrix generating apparatus 20 may comprise a piece of hardware. An arrangement and operation of the function realizing means of the threshold matrix generating apparatus 20 will be described later on.

In the present embodiment, the output system 22 basically comprises a CTP apparatus having an exposure unit 26 and a drum 27 with printing plate materials EM wound thereon. The exposure unit (also referred to as a multi-beam exposure unit) 26 applies a plurality of laser beams (recording beams), which are turned on and off for each pixel depending on the dot pattern data Ha, to the printing plate materials EM on the drum 27 that is being rotated in a main scanning direction MS by a main scanning motor (not shown) at a high speed, while the exposure unit 26 is being moved in an auxiliary scanning direction AS along the axis of the drum 27 by an auxiliary scanning motor (not shown). At this time, a dot pattern representing a two-dimensional image as a latent image is formed on each of the printing plate materials EM. The laser beams applied to the printing plate materials EM may be in several hundred channels.

The printing plate materials EM (usually, four printing plate materials with different screen angles for C, M, Y, K printing plates) on which the dot patterns are formed as latent images are developed by an automatic developing machine 28, producing printing plates PP with visible dot patterns formed thereon. The produced printing plates PP are mounted on a printing press (not shown), and inks are applied to the mounted printing plates PP.

The printing plate materials EM contain a photosensitive material which should preferably be a positive image recording material including an alkaline dissolvable binder, a substance for generating heat upon absorption of an infrared radiation or a near-infrared radiation, and a thermally decomposable substance for substantially lowering the dissolvability of the binder when not thermally decomposed, as disclosed in Japanese Patent No. 3461377. The printing plates PP should preferably be made of an image recording material including a photosensitive material which comprises a support base such as an aluminum sheet, a polyester film, or the like, and a layer including the above substances and mounted on the support base.

The alkaline dissolvable binder contains a phenolic resin, an acrylic resin, or a polyurethane resin. The substance for generating heat upon absorption of an infrared radiation or a near-infrared radiation comprises a dye, a pigment, or carbon black. The thermally decomposable substance for substantially lowering the dissolvability of the binder when not thermally decomposed comprises onium salt, diazonium salt, or a substance containing a quinone diazide compound.

When the inks applied to the printing plates PP are transferred to a printing sheet as a recording medium such as a photographic sheet or the like, a desired printed material comprising an image formed on the printing sheet is obtained.

The output system 22 is not limited to the scanning exposure apparatus employing laser beams, but may be an apparatus for forming an image on a film, a printing plate, or a printed material according to a planar exposure process or an ink jet process, or a CTC printing machine.

The threshold array of the threshold matrixes TM stored in the threshold matrix storage unit 14 can be recorded and carried around in a portable recording medium which is a packaged medium such as a DVD, a CD-ROM, a CD-R, a semiconductor memory, or the like.

A process of generating a threshold matrix using the threshold matrix generating system shown in FIG. 1 will be described below with reference to a flowchart of FIG. 2. The process shown in FIG. 2 is based on a program which is mainly executed by the threshold matrix generating apparatus 20.

Figure 2:
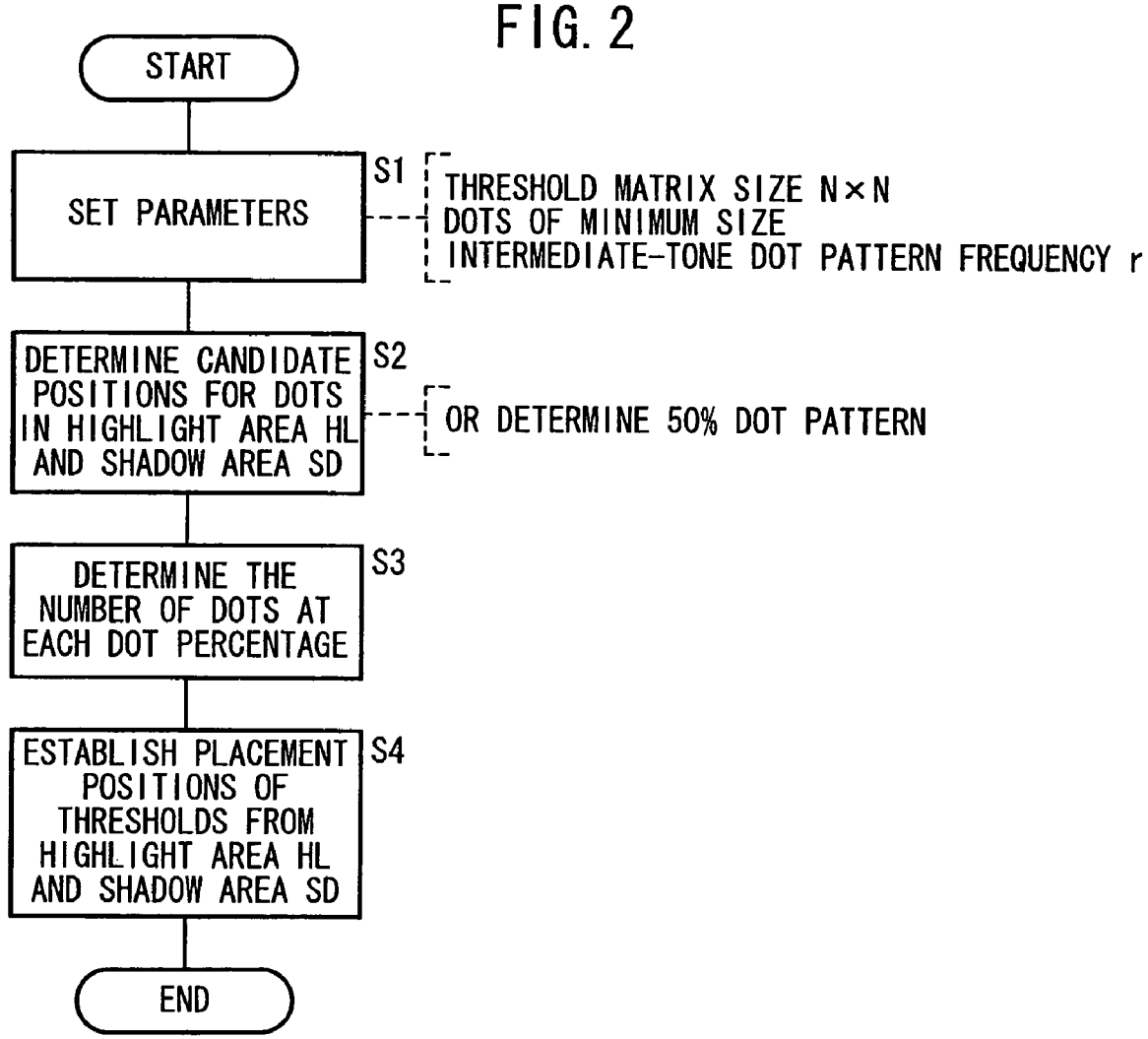
FIG. 2 is a flowchart of an overall sequence of the process of generating a threshold matrix which is carried out by the threshold matrix generating system shown in FIG. 1.

In step S1 shown in FIG. 2, three parameters are set. The first parameter represents the size of a threshold matrix TM to be stored in the threshold matrix storage unit 14, i.e., the size N×N of a threshold matrix TM which contains N×N thresholds corresponding to N×N pixels. The threshold matrix TM contains thresholds th ranging from 0 to thmax at respective positions (elements) determined by addresses (x, y). The maximum threshold thmax has a value that is set to "255" for a system having 8-bit gradations and "65535" for a system having 16-bit gradations. The size N×N of a square threshold matrix will be described below. However, the present invention is also applicable to the size N×M of an elongate rectangular threshold matrix. Actually, a plurality of threshold matrixes TM having the same threshold array and matrix size N×N and laid out as tiles (referred to as a superthreshold matrix STM) are used depending on the size of an image to be processed. The thresholds th of the threshold matrix TM is determined in view of the threshold array of the entire superthreshold matrix STM.

In the present embodiment, the size of a pixel that can be output from the output system 22 is represented by 10 μm×10 μm, which corresponds to a 1×1-pixel dot or 1 pixel. The size 10 μm×10 μm is a minimum unit that can be controlled by the exposure unit 26 for recording image data on the printing plate materials EM.

The second parameter represents the number of pixels that make up a dot of a minimum size which can stably be output from the output system 22, or stated otherwise, can stably be formed on the printing plates PP which are output from the output system 22. The dot of a minimum size may be set to a 1-pixel dot (the number of pixels that make up a dot of a minimum size is one), a 2-pixel dot, a 3-pixel dot, a 2×2-pixel (the number of pixels that make up a dot of a minimum size is four) dot, a 2×3-pixel (6-pixel) dot, a 3×3-pixel (9-pixel) dot, etc. In the present embodiment, it is assumed that a dot of a minimum size that can stably be formed on the printing plates PP (in reality, the printed material) is a 2×2-pixel dot whose dot size is represented by 2×2=4 pixels.

The third parameter represents the pattern frequency at a predetermined dot percentage (also referred to as density percentage) in intermediate tones having a dot percentage in the range from 10% to 50%, i.e., the pattern frequency r of an intermediate tone dot pattern. The pattern frequency r of an intermediate tone dot pattern represents the peak spatial frequency fpeak c/mm of a dot pattern in an intermediate tone.

In reality, the peak spatial frequency fpeak is concerned with the reproduction of image details, and also affects image quality in terms of graininess. In the present embodiment, the pattern frequency r is set to a visually sufficiently small value of 20 c/mm, i.e., 508 (20×25.4) LPI (Line Per Inch) (fpeak=r=20 c/mm).

In step S2, a dot candidate position in a highlight area HL and a dot candidate position in a shadow area SD are determined to provide the pattern frequency r in an intermediate tone.

Figure 3A:
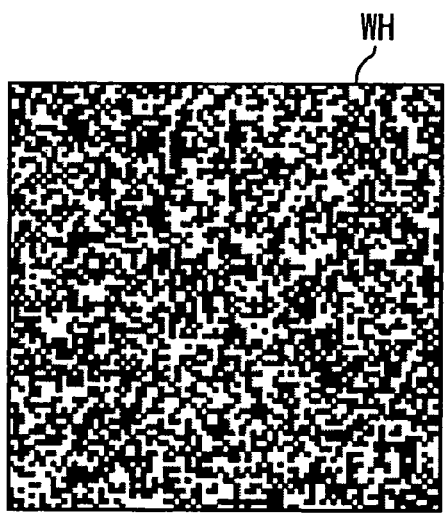
FIG. 3A is a diagram of a white noise pattern generated at a dot percentage of 50% by 1×1 pixel FM-screened dots.

First, as shown in FIG. 3A, a white noise generator 30 generates a white noise pattern WH at a dot percentage of 50% having the same size N×N as the size N×N of the threshold matrix TM. The white noise pattern WH is an image where 1-pixel dots are randomly positioned in a spatial domain. The white noise pattern WH can be generated so as to have desired values in an intermediate tone having a dot percentage in the range from 10% to 90%.

Figure 3B:
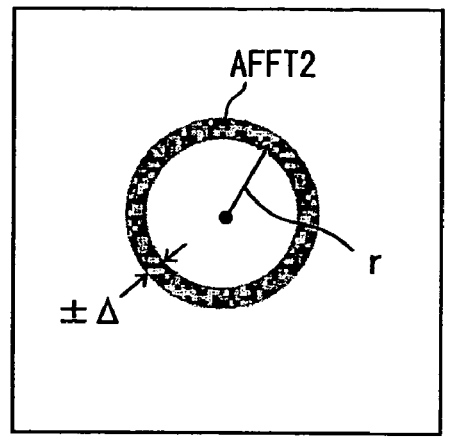
FIG. 3B is a diagram showing an FFT process and a bandpass filtering process on the white noise pattern.

Second, the white noise pattern WH is FFTed by an FFT (Fast Fourier Transform) unit 32, and then subjected to a bandpass filtering process at the pattern frequency r (±Δ) by a pattern frequency bandpass filter (pattern frequency BPF) 34, producing ring-shaped frequency-domain data AFFT2 having a radius equal to the pattern frequency r, as shown in FIG. 3B.

Figure 3C:
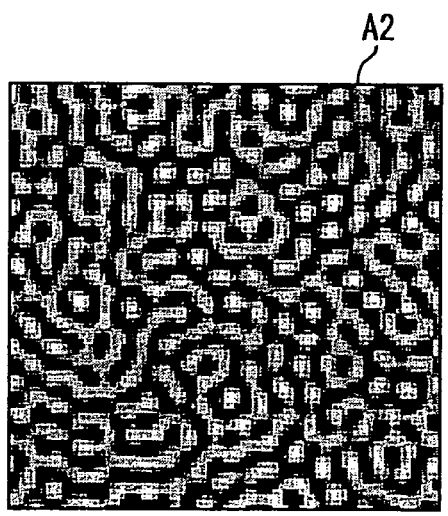
FIG. 3C is a diagram showing an IFFT-processed space-domain image converted from the frequency-domain image shown in FIG. 3B.

Third, the frequency-domain data AFFT2 is IFFTed by an IFFT (Inverse Fast Fourier Transform) unit 36, producing space-domain data A2 of a continuous-tone image, as shown in FIG. 3C.

Figure 3D:
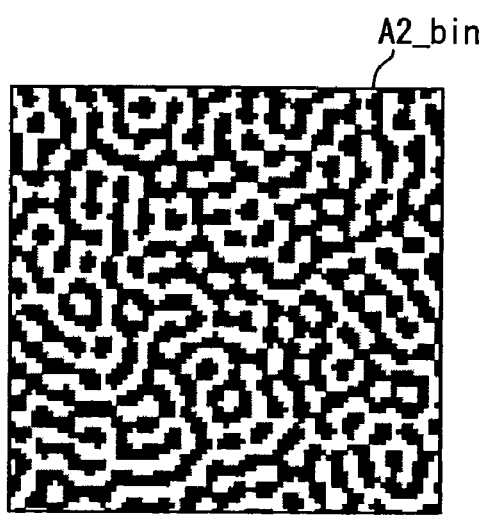
FIG. 3D is a diagram showing a binary image converted from the space-domain image shown in FIG. 3C.

Fourth, the value of each of the pixels of the spatial-domain data A2 is compared with a central gradation value (e.g., 127 if the maximum gradation is 255) by a comparator 38, generating binary data A2_bin, as shown in FIG. 3D.

Of the binary data A2_bin, blackened portions (areas) serve as dot candidate positions in highlight areas HL and white portions (areas) serve as dot candidate positions in shadow areas SD.

The binary data A2_bin represent candidate positions for placing dots in highlight areas HL or the shadow areas SD. The pattern of the binary data A2_bin may not necessarily be produced when the dot percentage is 50%. When the binary data A2_bin do not actually represent an optimum 50% dot pattern, the pattern may be changed for achieving the optimum dot pattern.

However, a 50% dot pattern can be established when a characteristic dot pattern is to be used at the dot percentage of 50% or when the dot pattern corresponding to the binary data A2_bin can be corrected into an optimum 50% dot pattern.

Then, in step S3, the number Dn of dots of a minimum size (also referred to as the number of dots of a new minimum size dots or the number of new dots of a minimum size) to be newly set at a present dot percentage is determined with respect to the dot percentage for which a dot pattern has been determined. The number Dn(P) of new dots of a minimum size to be established at each dot percentage P % is expressed as $Dn(P)=Ds(P)-Ds(P-1)$ where Ds(P) represents the number of accumulated dots (accumulated values) at each dot percentage P.

Specifically, in step S3, when candidate positions for dots are successively determined as the dot percentage is incremented, the number Dn(P) of dots of a minimum size to be newly established at a present dot percentage P is determined with respect to the preceding dot percentage P−1 for which a dot pattern has already been determined.

When a dot pattern has a dot percentage P with respect to the size N×N of a threshold matrix TM, the total number of blackened pixels in the dot pattern corresponding to the size N×N of the threshold matrix TM is calculated as N×N×P/100. If all the dots of a dot pattern comprise only dots of a minimum size as 2×2 (n=4)-pixel dots, then since the number of dots of a minimum size at each dot percentage P is expressed as $Ds(P)=(N\times N\times P/100)/n$, it is given as $(N\times N\times P/100)/n$ (n=4), as indicated by a solid straight curve na in FIG. 4, for example.

At this time, the number Dn(P) of dots of a minimum size to be newly established at each dot percentage P is expressed as $Dn(P)=Ds(P)-Ds(P-1)=(N\times N/100)/n$.

The vertical axis of the graph shown in FIG. 4 represents a calculated accumulated value Ds of the number Dn of dots of a minimum size to be newly established (the number of new dots). Actually, as the dot percentage P becomes greater than 25%, since adjacent dots of a minimum size become closer to each other, the actual number of dots in a dot pattern is smaller than the accumulated value of the number Dn of new dots shown in FIG. 4.

If the number Dn of new dots are determined at each dot percentage according to the solid straight curve na in FIG. 4 which represents the accumulated value of the number Dn of new dots, then the threshold matrix produces a conventional FM screen, which causes disadvantages in that a dot gain tends to become large and images are reproduced unstably when images are printed or films are output in an intermediate printing process.

According to an embodiment of the present invention, in view of the fact that the pattern frequency is low in highlight areas where the dot percentage is less than 10%, all dots comprise dots of a minimum size in those highlight areas. In intermediate tone areas where the dot percentage ranges from 10% to 50%, the size of dots is increased from the minimum size, e.g., dots composed of 5 pixels (2×2+1) or more are used. Specifically, in a dot percentage range from 10% to 25%, the number Dn of new dots to be established at each dot percentage is gradually reduced, as indicated by a broken-line curve nc which represents the accumulated value of the number of new dots. In a dot percentage range from 25% to 50%, the number Dn of new dots to be established at each dot percentage is set to zero. Alternatively, the number Dn is gradually increased, as indicated by the dot-and-dash-line curve nb which represents the accumulated value of the number of new dots.

In the present embodiment, since the output resolution R of the output system is 100 pixels/mm or 10 μm/pixels, and the pattern frequency r of the intermediate tone dot pattern is r=20 c/mm, each side of the N×N-pixel area has to contain 20 blackened dots (one dot comprises 2×2 pixels with r c/mm) of a minimum size, each composed of 4 pixels per 100 pixels/mm (R pixels/mm). In terms of the size of the N×N-pixel threshold matrix TM, the accumulated value Ds of the number Dn of new dots up to the intermediate tone areas is represented by $(N/(R/r))^2 = N\times N\times(r/R)^2 = N\times N\times(20/100)^2 = N\times N\times 0.04$.

With the above settings, in the intermediate tone areas where the dot percentage ranges from 10% to 50%, the total number of pixels of a dot pattern generated by the threshold matrix TM at each dot percentage is the same as with the conventional FM screens, i.e., the dot percentage is the same, but the number of dots is smaller than with the conventional FM screens. Therefore, a periphery length representing the sum of the lengths of the peripheries of all the dots of the dot pattern is smaller than with the conventional FM screens.

In the present description, the periphery length (also referred to as a dot pattern periphery length) represents the sum of the lengths of white/black boundaries per unit area of a dot pattern. It is known in the art that the periphery length is correlated to the dot gain and the output/printing stability.

Figure 5A:
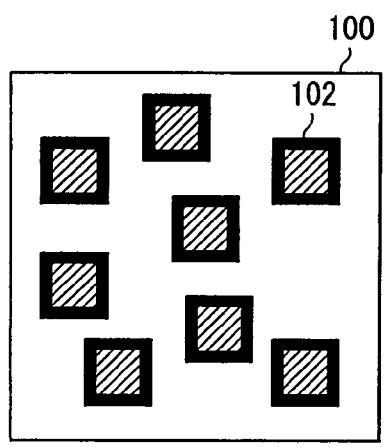
FIG. 5A is a diagram showing a periphery length of small dots.
Figure 5B:
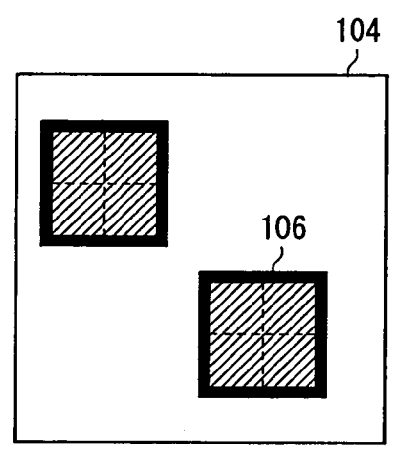
FIG. 5B is a diagram showing a periphery length of large dots at the same dot percentage as with FIG. 5A.

For example, as can be seen from dot patterns 100, 104 having the same area shown in FIGS. 5A and 5B, the dot pattern 100 contains eight 1×1-pixel dots 102 each having a periphery length 4L where L represents the length of one side of each dot, and the dots 102 have a total area $8L^2$ and a periphery length 32L. The dot pattern 104 contains two 2×2-pixel dots 106 each having a periphery length 8L where 2L represents the length of one side of each dot, and the dots 106 have a total area $8L^2$ and a periphery length 16L. Though the total area of the dots 102 of the dot pattern 100 and the total area of the dots 106 of the dot pattern 104 are the same as each other, the dot patterns 100, 104 have different periphery lengths. Stated otherwise, though the dot pattern 100 and the dot pattern 104 have the same dot percentage, the sum of the lengths of white/black boundaries per unit area of the dot pattern 104, i.e., the dot periphery length of the dot pattern 104, is one-half of the periphery length of the dot pattern 100.

When the dot pattern 100 having the periphery length 32L is varied by a dot gain to have its dot percentage increased by +10%, the dot pattern 104 having the periphery length 16L is expected to have its dot percentage increased by +5%.

Various variations indicative of stability such as a dot gain are considered to be essentially proportional to the periphery length of the dot pattern.

Generally, if a dot pattern of a higher resolution is generated, then the number of pixels making up each dot is reduced, and the periphery length is increased, resulting in poorer stability.

Therefore, provided that two dot patterns have the same resolution, one of the dot patterns which has a smaller (shorter) dot periphery length is a higher-performance dot pattern. There has not been available a general index for evaluating the dot pattern performance based on the dot periphery length. According to the present invention, a dot pattern periphery length evaluation index (also referred to as a dot pattern evaluation index) is defined based on a value in AM screens to specify a dot pattern, as follows.

Figure 6:
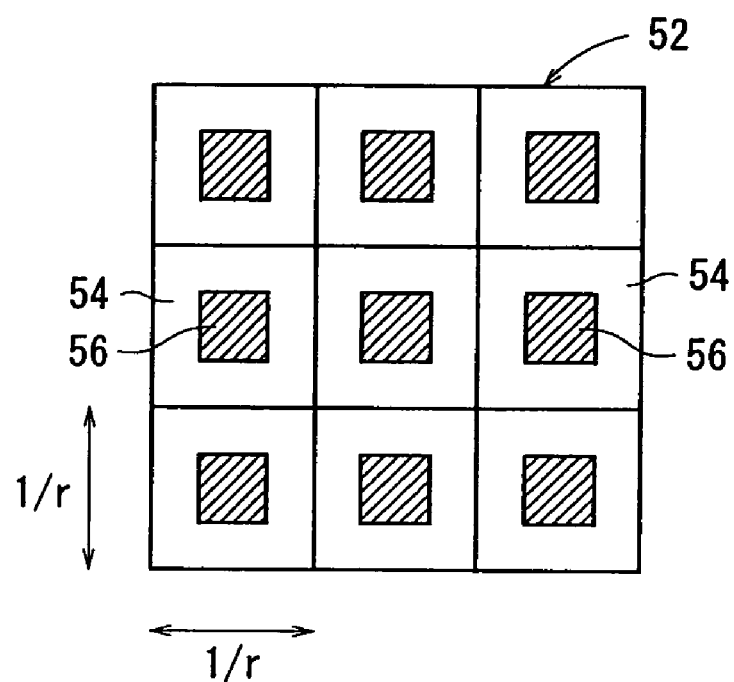
FIG. 6 is a diagram showing a regular dot pattern used to illustrate a dot pattern periphery length evaluation index.

When the resolution of a dot pattern (also referred to as a pattern resolution or a pattern frequency) is represented by r c/mm, the resolution of the output system by R pixels/mm, and the blackened ratio of the dot pattern by Q (Q=P/100), a regular dot pattern 52 shown in FIG. 6 is assumed.

Each side of each square pattern 54 in the dot pattern 52 with the pattern frequency r has a length 1/r mm. R/r, which is the product of the length 1/r mm and the output resolution R pixels/mm, represents the number of pixels per side length. If the scanning exposure process is employed, then R/r represents the number of raster lines (scanning lines) per side length.

If the square pattern 54 has a blackened ratio Q, then the area (occupied area) of a dot 56 in the square pattern 54 is represented by $(1/r)^2 \times Q$ mm². With respect to a dot whose blackened ratio Q is 0.5 or more, the whitened ratio Q' (Q'=1−Q) of a whitened area in the square pattern 54 is used to characterize the dot.

If it is assumed that the dot 56 is of a square shape, then the length of each side of the dot 56 is represented by $(1/r) \times Q^{1/2}$ mm.

The dot pattern periphery length per unit area (the length of boundary lines of black and white pixels) will be considered in terms of square patterns 54 each having an area 1/r×1/r.

In the vertical direction (the main scanning direction) in FIG. 6, the periphery length of the dot 56 in one square pattern 54 is represented by $(1/r) \times Q^{1/2} \times 2$ mm. The length of pixels in the vertical direction in one square pattern 54 (also referred to as the length of unit scanning lines) is represented by (R/r) (i.e., "the number of pixels per side length or the number of scanning lines per side length")×(1/r) (i.e., "the length of one side")=(R/r)×(1/r) pixels/mm. The dot periphery length in the length of unit scanning lines in the vertical direction (the main scanning direction) is represented by $(1/r) \times Q^{1/2} \times 2/((R/r) \times (1/r)) = (2 \times r \times Q^{1/2})/R$.

Similarly, in the auxiliary scanning direction, the dot periphery length (referred to as a reference periphery length proportion) Ref_sur in the overall square pattern 54 as a unit area is expressed according to the following equation (1):

$$\text{Ref\_sur} = (4 \times r \times Q^{1/2})/R \quad (1)$$

It can be seen from the equation (1) that if the output resolution R is constant, then the dot periphery length is proportional to the pattern frequency r of the dot pattern. Actually, the pattern frequency r of the dot pattern is proportional to the output resolution R. Thus, a dimensionless value r/R that indicates the fineness of the dot pattern represents a numeral affecting the equation (1). However, the output resolution R and the pattern frequency r of the dot pattern are separately used so as to be practically applicable with ease.

Figure 22:
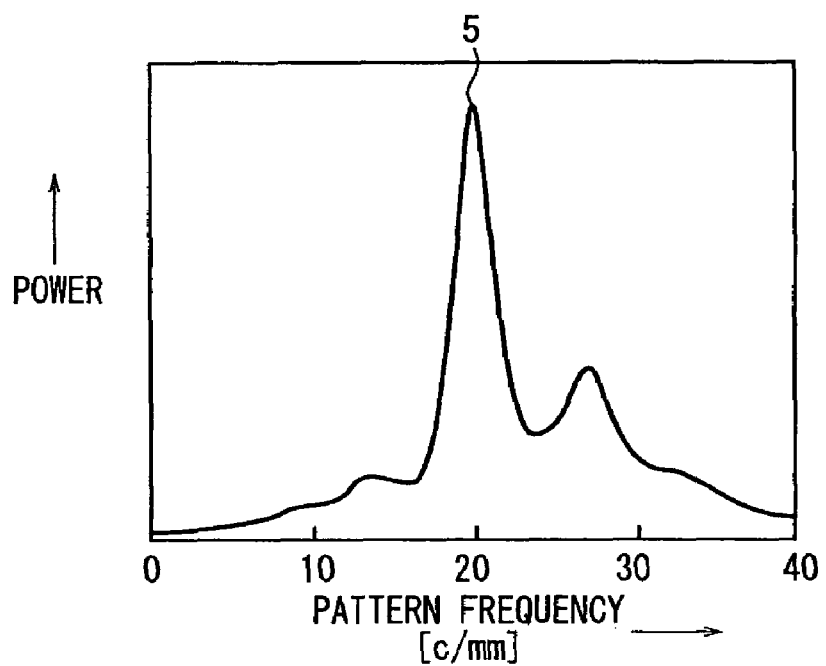
FIG. 22 is a diagram showing a power spectrum generated when the dot pattern at the dot percentage of 50% of the 2×2 pixel FM-screened dots is processed by FFT.
Figure 23:
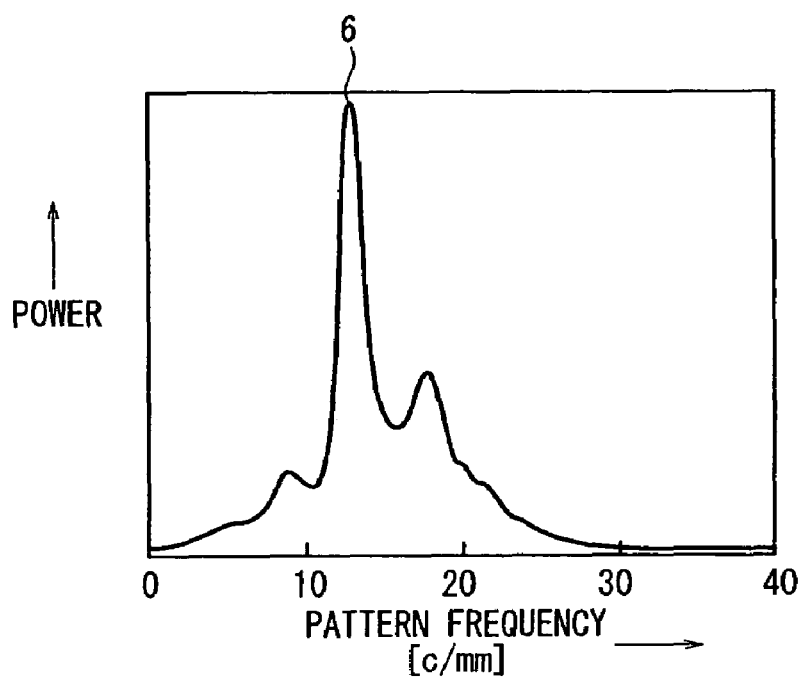
FIG. 23 is a diagram showing a power spectrum generated when the dot pattern at the dot percentage of 50% of the 3×3 pixel FM-screened dots is processed by FFT.

As shown in FIGS. 22 and 23, the pattern frequency r is judged from the frequency characteristics produced after the dot pattern is FFTed. If the peak frequency fpeak is clear, as indicated by frequency characteristic curves 60, 61 shown in FIGS. 7A and 7B, then the peak frequency fpeak is used as the pattern frequency r of the dot pattern.

However, if there are two or more frequencies each having an intensity equal to or greater than one-half of the peak frequency fpeak, as indicated by frequency characteristic curves 62, 63 shown in FIGS. 7C and 7D, then a frequency determined as the weighted mean of the above frequencies is used as the pattern frequency r of the dot pattern. The weighted mean is expressed by the following equation (2):

$$\text{fpeak} = (\text{average of } \Sigma(\text{freq} \times \text{fpower}))/(\text{average of } \Sigma \text{fpower}) \quad (2)$$

where freq represents a frequency having an intensity equal to or greater than one-half of the peak frequency fpeak, and fpower represents the power (intensity) of the frequency. Therefore, fpower is represented as each of hatched areas in FIGS. 7C and 7D.

A dot pattern having a frequency characteristic curve 64 (see FIG. 7E) which has no clear peaks within a frequency range from 0 to R/2 c/mm where an analysis after FFT is valid, cannot have a pattern frequency r defined.

According to an example, it is assumed that the output system 22 has a general output resolution R=2400 pixels/inch=94.488 pixels/mm with dots having a screen ruling of 175 (the pattern frequency r=6.89 c/mm) and a dot percentage P=50% (Q=0.5). The reference periphery length proportion Ref_sur which represents a dot periphery length in one dot (corresponding to a dot pattern formed by one threshold matrix) is 0.206 as calculated below.

$$\begin{aligned}\text{Ref\_sur} &= (4 \times r \times Q^{1/2})/R \\ &= (4 \times 6.89 \times 0.5^{1/2})/94.488 \\ &= 0.206\end{aligned}$$

The reference periphery length proportion Ref_sur of 0.206 means that about 20 percent of the periphery length of all the pixels making up square dots 56 which are arranged at equal intervals at the pattern frequency r constitute black/white boundary lines.

If the screen ruling is 350 (the pattern frequency r=13.78 c/mm), then the reference periphery length proportion Ref_sur is 0.412.

The value of the reference periphery length proportion Ref_sur represents the periphery length (also referred to as an ideal periphery length) of square dots 56 which are arranged at equal intervals at a certain pattern frequency r (pitch 1/r).

Using the reference periphery length proportion Ref_sur, an evaluation index for the periphery length of a dot pattern formed by digital data that can actually be calculated is expressed by the following equation (3):

$$\text{Dot pattern periphery length evaluation index} = \text{Mes\_sur}/\text{Ref\_sur} \quad (3)$$

where Mes_sur represents a periphery length proportion per unit area calculated from a dot pattern actually formed by a digital pattern.

When the dot pattern periphery length evaluation index Mes_sur/Ref_sur has a value of 1, it means that the periphery length of the dot pattern is equal to the periphery length of square patterns (square patterns arranged at equal intervals) 54 having the same pattern frequency r. As the dot pattern periphery length evaluation index Mes_sur/Ref_sur has a smaller value, the dot pattern has a shorter periphery length with respect to the pattern frequency r, indicating that the screen is stabler. Unlike AM screens, FM screens are made up of smaller dots. Stated otherwise, FM screens have more scattered dots than AM screens at the same dot percentage. Therefore, the dot pattern periphery length evaluation index Mes_sur/Ref_sur for FM screens is considered to have a value greater than 1 in most cases.

The dot pattern periphery length evaluation index Mes_sur/Ref_sur for the dot pattern 2 (see FIG. 21) in the intermediate tone area where the dot percentage of the 2×2-pixel FM screen is 50% will be calculated below.

Figure 21:
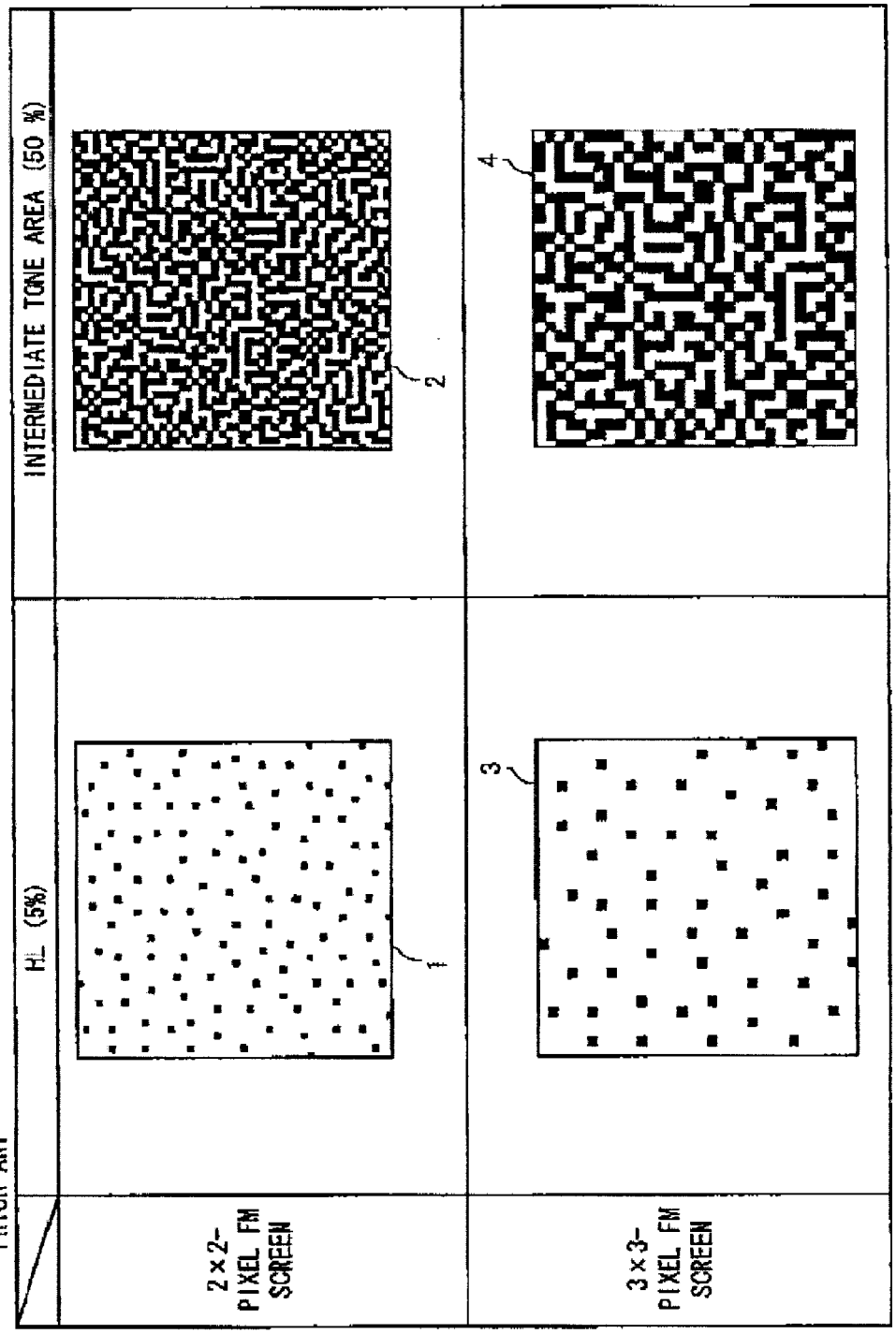
FIG. 21 is a diagram showing dot patterns at dot percentages of 5% and 50% of 2×2 pixel FM-screened dots and dot patterns at dot percentages of 5% and 50% of 3×3 pixel FM-screened dots according to conventional art.

First, the periphery length proportion Mes_sur of the dots of the dot pattern 2 of the 2×2-pixel FM screen shown in FIG. 21 is calculated as Mes_sur=0.6302.

With the dot pattern 2, as shown in FIG. 22, the pattern frequency r corresponding to the peak spatial frequency fpeak, when calculated to three significant digits, is r=19.9 c/mm. Therefore, the reference periphery length proportion Ref_sur is calculated as $\text{Ref\_sur}=(4\times r\times Q^{1/2})/R=(4\times 19.9\times 0.5^{1/2})/94.488=0.5956$.

Therefore, the dot pattern periphery length evaluation index Mes_sur/Ref_sur is calculated as Mes_sur/Ref_sur=0.6302/0.5956=1.058.

FIG. 8 shows a characteristic curve 66 representing the dot pattern periphery length evaluation index Mes_sur/Ref_sur for the dot pattern of the conventional 2×2-pixel FM screen at each dot percentage, and a characteristic curve 68 representing the dot pattern periphery length evaluation index Mes_sur/Ref_sur for the dot pattern of a 2×2-pixel FM screen where the dots are of a minimum size, which is generated according to the present embodiment as described later on.

It can be seen from the characteristic curves 66, 68 that since highlight areas in a dot percentage range from 0 to 20% and shadow areas in a dot percentage range from 80 to 100% are made up of independent dots such as blackened dots or white dots each comprising 2×2 pixels, i.e., dots comprising only 2×2-pixel dots with no surrounding pixels, the dot pattern periphery length evaluation index Mes_sur/Ref_sur is small in those dot percentage ranges. At a dot percentage of 50%, the dot pattern periphery length evaluation index Mes_sur/Ref_sur is also relatively small.

According to the characteristic curve 66 representing the dot pattern periphery length evaluation index Mes_sur/Ref_sur for the dot pattern of the conventional 2×2-pixel FM screen, the dot pattern periphery length evaluation index Mes_sur/Ref_sur is large in a dot percentage range from 25 to 45% and a dot percentage range from 55 to 75%.

In these dot percentage ranges from 25 to 45% and from 55 to 75%, as can be seen from the characteristic curve 66, the periphery length is longer with respect to the pattern frequency r of the dot pattern, indicating that the dot pattern includes elements which make output and printed image data unstable. According to the present embodiment, as can be understood from the characteristic curve 68 shown in FIG. 8, the dot pattern periphery length evaluation index Mes_sur/Ref_sur is smaller in the dot percentage ranges from 25 to 45% and from 55 to 75%.

The dot pattern periphery length evaluation index Mes_sur/Ref_sur should preferably have a value of 1.085 or less. It has been confirmed that the dot pattern periphery length evaluation index Mes_sur/Ref_sur should more preferably have a value of 1.065 or less for greater advantage.

The characteristic curves 66, 68 shown in FIG. 8 were plotted based on the results of calculations for 19 dot patterns for each of the characteristic curves 66, 68 in the dot percentage range from 5 to 95%. The calculated 19 dot patterns are sufficient enough to evaluate the dot pattern periphery length evaluation index Mes_sur/Ref_sur. This evaluating process is capable of evaluating the dot pattern periphery length evaluation index Mes_sur/Ref_sur in the entire dot percentage range from 0 to 100%. Of course, more dot patterns may be calculated to evaluate the dot pattern periphery length evaluation index Mes_sur/Ref_sur.

A process of generating a dot having a smaller periphery length will be described below. According to the process, a certain existing pixel in a dot is selected as a blackened pixel candidate if it makes the periphery length of the dot small based on the information of pixels in the vicinity of the noticed pixel.

Figure 9:
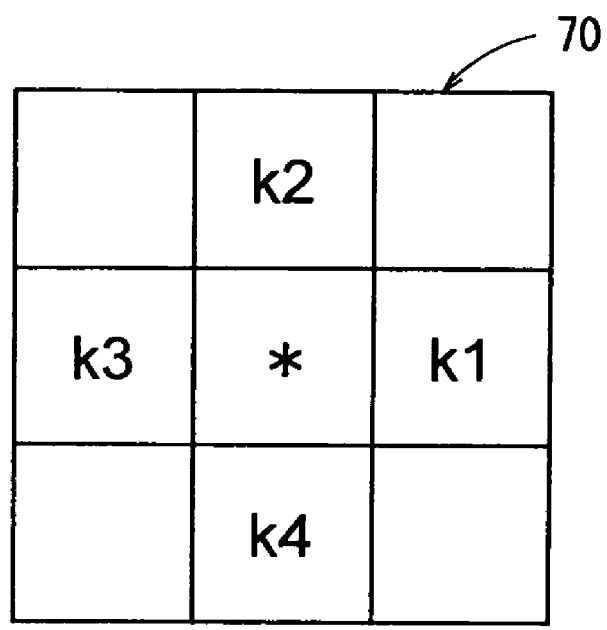
FIG. 9 is a diagram illustrative of a process of generating dots with a reduced periphery length.

For example, as shown in FIG. 9, an existing pixel* is noticed in a dot 70 which is made up of nine pixels each representing binary data, and the sum f(k) of four nearby pixels is determined as $f(k)=k1+k2+k3+k4$. If the sum f(k) is large, then the noticed pixel* is determined as a blackened pixel candidate, i.e., a candidate position for placing a present threshold (a threshold for a next gradation) therein.

Figure 10A:
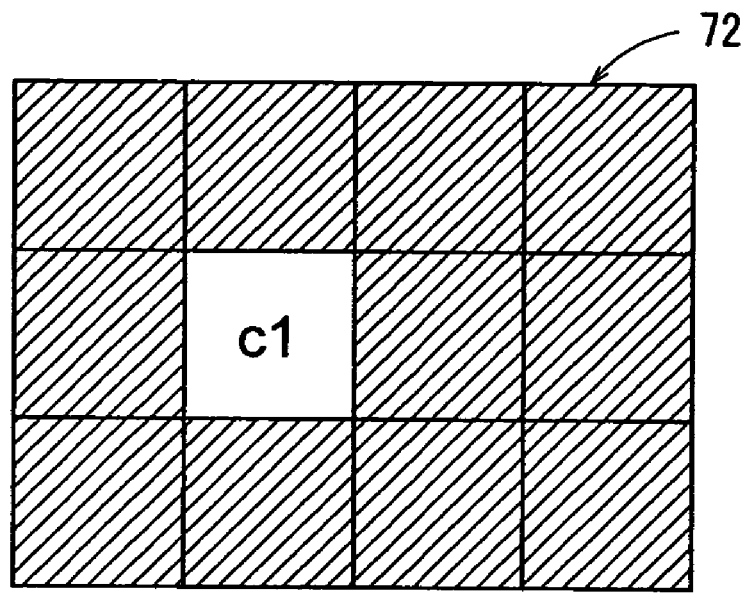
FIG. 10A is a diagram showing a pixel position for reducing a periphery length.
Figure 10B:
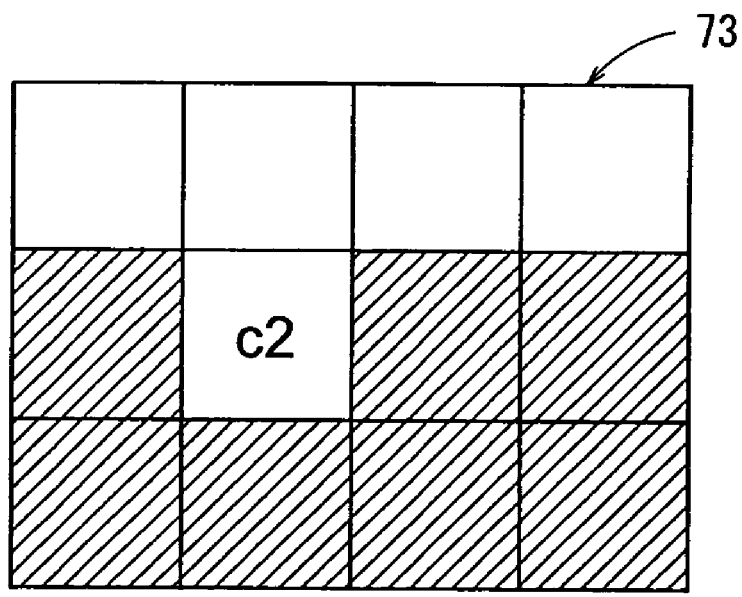
FIG. 10B is a diagram showing another pixel position for reducing a periphery length.

FIG. 10A shows a pixel c1 which is positioned in a dot 72 such that the sum f(k) of four nearby pixels is 4, and FIG. 10B shows a pixel c2 which is positioned in a dot 63 such that the sum f(k) of four nearby pixels is 3. These pixels c1, c2 are preferentially selected as threshold positioning candidates (blackened pixel candidates), thereby generating dots with smaller dot periphery lengths.

The above example is simplest in that the periphery length of a dot is made smaller using the sum f(k) of four pixels in the vicinity of a noticed pixel. Alternatively, a pixel in a dot may be selected as a blackened pixel candidate for making the periphery length of the dot smaller, by using the information of eight nearby pixels or performing any of various bit pattern matching processes on nearby pixels.

For evaluating a dot pattern, not only an average periphery length per unit area serves as an important index, but also the uniformity of the periphery length of a dot pattern affects the evaluation. In particular, when the exposure unit 26 relatively or actively scans the drum 27 to record pixels on the printing plate materials EM wound thereon, if the periphery length of a dot differs on different scanning lines, a scanning line which maximizes the periphery length of the dot is more liable to cause unevenness on the recorded image due to a large image variation developed by the periphery length of the dot than other scanning lines. Provided the periphery lengths of dots have the same average value, such image unevenness is less visually perceptible if the maximum value of the periphery length of the dot is smaller. Stated otherwise, provided that dots are uniformly distributed, image unevenness is less visually perceptible if the degree of a variation of the periphery length of the dot in the direction of the scanning lines is smaller.

A process of generating a dot where the degree of a variation of the periphery length of the dot in the direction of the scanning lines is smaller will be described below.

For generating a dot where the degree of a variation of the dot periphery length is smaller, i.e., a dot where the dot periphery length has a smaller standard deviation σ, boundaries of dots (boundaries between blackened pixels and white pixels) should preferably be present uniformly on each scanning line. Therefore, linearly aligned pixels are not preferable.

Figure 11A:
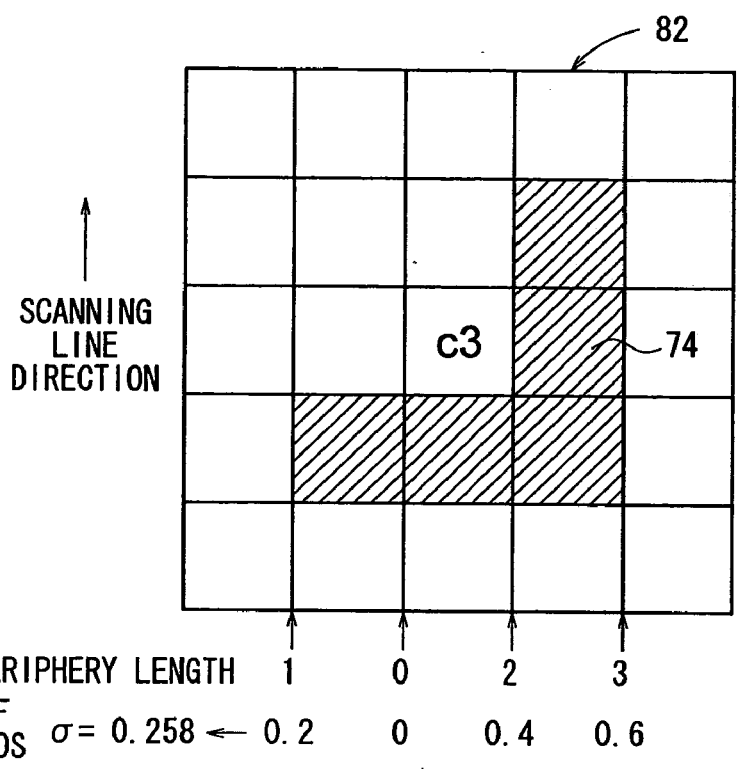
FIGS. 11A and 11B are diagrams showing pixel positions for reducing the degree of variations of a periphery length in the direction of a scanning line.
Figure 11B:
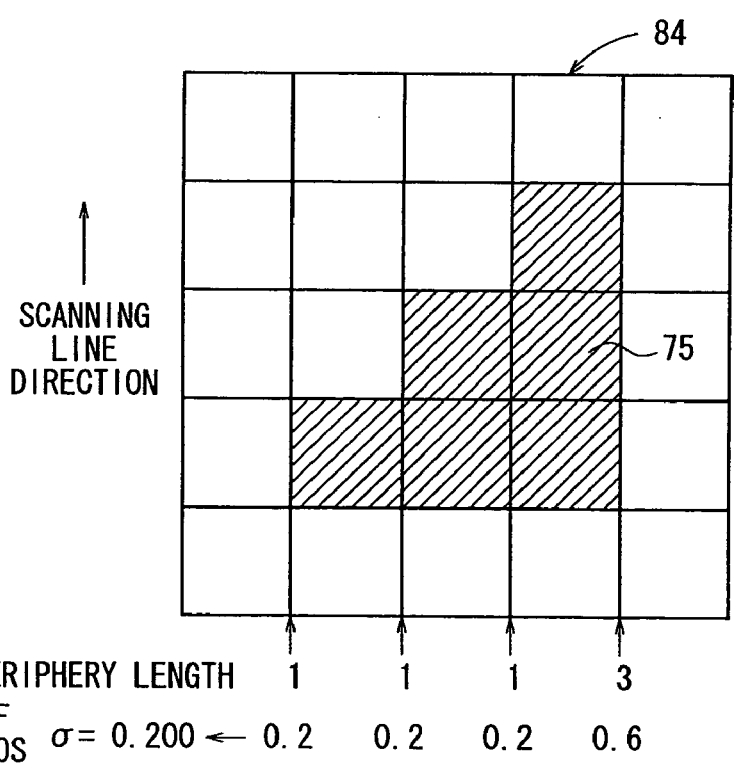

For example, as shown in FIG. 11A, when a noticed pixel c3 is judged according to a pattern matching process based on eight nearby pixels including a dot 74 made up of five pixels arranged in an inverted L-shaped array, the noticed pixel c3 is determined as a candidate position for a blackened pixel (a threshold to be determined this time). If the noticed pixel c3 is selected as a pixel candidate, then a dot 75 made up of six pixels is produced as shown in FIG. 11B. The dots 74, 75 have the same periphery length in the direction of scanning lines. However, the standard deviation σ of the periphery length in the direction of scanning lines is smaller for the dot 75 than for the dot 74.

Specifically, with respect to the dot 74, as shown in FIG. 11A, the periphery lengths successively from the left along the respective scanning lines are (1, 0, 2, 3), the average of the periphery lengths is 1.5 (6/4), and the standard deviation σ of the periphery lengths is $\sigma=[\{(-0.5)^2+(-0.5)^2+(0.5)^2+(1.5)^2\}/3]^{1/2}=1.29$. With respect to the dot 75, as shown in FIG. 11B, the periphery lengths successively from the left along the respective scanning lines are (1, 1, 1, 3), the average of the periphery lengths is 1.5, and the standard deviation (a of the periphery lengths is $\sigma=[\{(-0.5)^2+(-0.5)^2+(-0.5)^2+(1.5)^2\}/3]^{1/2}=1.0$ The process described above with reference to FIGS. 11A, 11B is illustrated as a relatively simply example. It is also possible to reduce the standard deviation σ according to a pattern matching process based on eight nearby pixels or a pattern matching process based on twenty-four nearby pixels.

Figure 12A:
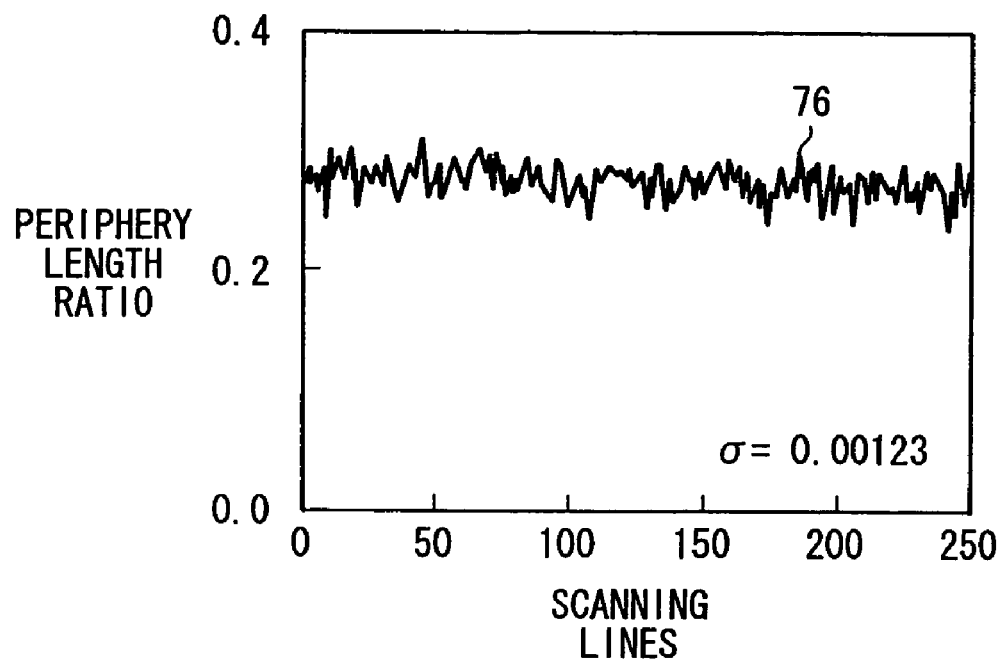
FIG. 12A is a diagram showing the periphery length ratio of a dot pattern according to the embodiment.
Figure 12B:
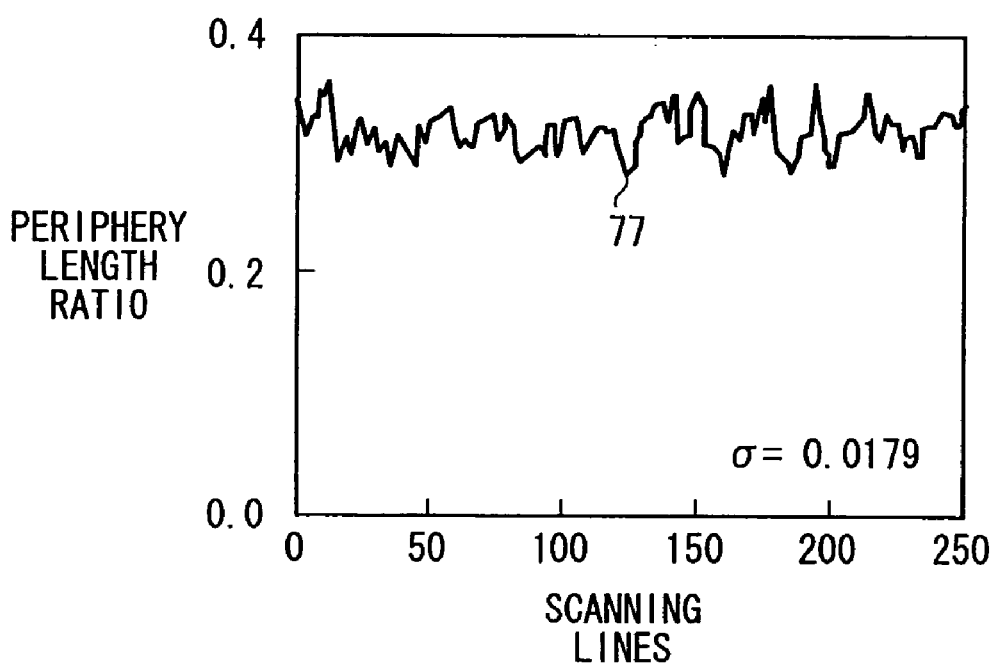
FIG. 12B is a diagram showing the periphery length ratio of a conventional dot pattern.

FIG. 12A shows a characteristic curve 76 representing peripheral length ratios in the direction of scanning lines (proportions by which scanning line lengths are held in contact with blackened pixels) in a dot pattern having a dot percentage of 50% (a dot pattern 135 shown in FIG. 19E) according to the embodiment. FIG. 12B shows a characteristic curve 77 representing peripheral length ratios in the direction of scanning lines in the dot pattern 2 (see FIG. 21) of the conventional 2×2-pixel FM screen where the dot percentage is 50%.

It can be seen that the characteristic curve 76 representing peripheral length ratios in the dot pattern according to the present embodiment suffers less variations than the characteristic curve 77 representing peripheral length ratios in the conventional dot pattern. The standard deviation σ of the peripheral length ratios is σ=0.00123 according to the process of the embodiment, and σ=0.0179 according to the conventional process.

FIG. 13 shows a characteristic curve 78 of the standard deviation σ of the peripheral length ratios of the dot pattern 2 of the conventional 2×2-pixel FM screen and a characteristic curve 80 of the standard deviation σ of the dot pattern 135 according to the present embodiment, the characteristic curves 78, 80 being plotted by determining a periphery length ratio for each scanning line at each dot percentage and plotting the standard deviation σ of the periphery length ratio at each dot percentage.

It can be seen from FIG. 13 that the standard deviation σ of the peripheral length ratios, which is indicative of the degree of variations of the periphery length ratio for each scanning line, should preferably be 0.019 or less, or more preferably be 0.018 or less, for all the dot percentages.

By determining the standard deviation σ of the peripheral length ratios at the 19 dot percentages at intervals of 5%, it is possible to grasp the standard deviation σ of the peripheral length ratios which represents variations of the periphery length ratio in the direction of scanning lines at all the dot percentages.

With respect to a dot pattern 82 which is five pixels long in the direction of scanning lines in FIG. 11A, for example, periphery length ratios for the four central scanning lines are calculated as (0.2, 0, 0.4, 0.6) successively from the left. Since the average of these periphery length ratios is 0.3, the standard deviation σ of the periphery length ratios in the direction of scanning lines is given as $\sigma=\sigma=[\{(-0.1)^2+(-0.3)^2+(0.1)^2+(0.3)^2\}/3]^{1/2}=0.258$.

With respect to a dot pattern 84 which is five pixels long in the direction of scanning lines in FIG. 11B, periphery length ratios for the four central scanning lines are calculated as (0.2, 0.2, 0.2, 0.6) successively from the left. Since the average of these periphery length ratios is 0.3, the standard deviation σ of the periphery length ratios in the direction of scanning lines is given as $\sigma=[\{(-0.1)^2+(-0.1)^2+(-0.1)^2+(0.3)^2\}3]^{1/2}=0.20$.

If the relationship of the accumulated value Ds of the number Dn of dots with respect to the dot percentage is established according to the curve nc shown in FIG. 4, then an increase in the dot gain in the intermediate tone areas is made smaller than with an FM screen where the accumulated value Ds is established according to the curve na. In addition, a sufficient resolution is provided in all the range of dot percentages as with the conventional FM screens. Actually, therefore, as indicated by the dot-and-dash-line curve nb which represents the accumulated value of the number of new dots in FIG. 4, the number Dn of new dots of a minimum size is established such that it increases again a substantially constant number after the dot percentage exceeds 25% and until it reaches 50%. According to the curve nb, dots are prevented from contacting each other in the vicinity of the dot percentage of 50%, thus avoiding the occurrence of a tone jump.

In the dot percentage range from 50% to 100%, the accumulated value Ds of the number Dn of new dots may be established according to a curve which is in symmetric relation to the curves nc, nb with respect to the vertical line at the dot percentage of 50%. In the dot percentage range from 50% to 100%, the curve is analyzed from 100% toward 50%, and the number of new dots of white pixels (2×2 white pixels) is considered rather than the number Dn of new dots of blackened pixels.

A process of determining thresholds th alternately successively in ascending and descending orders in the highlight area HL and the shadow area SD in step S4 will be described below with reference to a flowchart shown in FIG. 14. For the sake of brevity, the process of successively determining thresholds th in the highlight area HL will mainly be described below. In the shadow area SD, the same process of successively determining thresholds th is carried out.

In step S11, the initial values of thresholds th_hl {0 through (thmax−1)/2} in the highlight area (0% through 50%) and thresholds th_sd {thmax through (thmax−1)/2} in the shadow area,(100% through 50%) are determined to be th_hl=0, th_sd=thmax, respectively.

In the flowchart shown in FIG. 14, positions (array) for placing all thresholds th up to the dot percentage of 50% are determined in the order of threshold 0→threshold thmax→threshold 1→threshold thmax−1→ . . . →threshold (thmax−1)/2.

For determining an array (placement positions) of thresholds th_hl in the highlight area, dot center positions are established in step S12. In step S12, dot center positions of the number Dn of new dots determined in step S3 for the dot percentages, among the dot candidate positions in the highlight area HL of the blackened portion (region) of the binary data A2_bin (see FIG. 3D) determined in step S2, are established.

As described in Japanese Laid-Open Patent Publication No. 8-265566, the dot center positions are determined such that the dots established (assigned) by the thresholds th_hl whose placement positions are to be determined in the present threshold matrix TM are established in positions most spaced from the presently existing dots determined by the thresholds th_hl−1 for the preceding gradation where the placement positions of the thresholds th in the threshold matrix TM have already been determined.

For an easier understanding, the process will be described with reference to FIG. 15 which shows a super-threshold matrix STM made up of nine threshold matrixes TM1 through TM9 each having 25 thresholds. When positions for placing thresholds are determined in an ascending order from the highlight areas HL of the threshold matrixes TM or in a descending order from the shadow areas SD thereof, central positions of newly placed thresholds th_hl are determined such that the already determined positions for placing thresholds th ("1" in FIG. 15) and the positions for newly placing thresholds th_hl ("2" in FIG. 15) are most spaced from each other in the threshold matrixes TM including a central threshold matrix (a 5×5 threshold matrix in FIG. 15) TM5 and other threshold matrixes TM1 through TM4, TM6 through TM9 of the same threshold layout which are disposed around the central threshold matrix TM5 as nine nearby threshold matrixes in FIG. 15.

Figure 15:
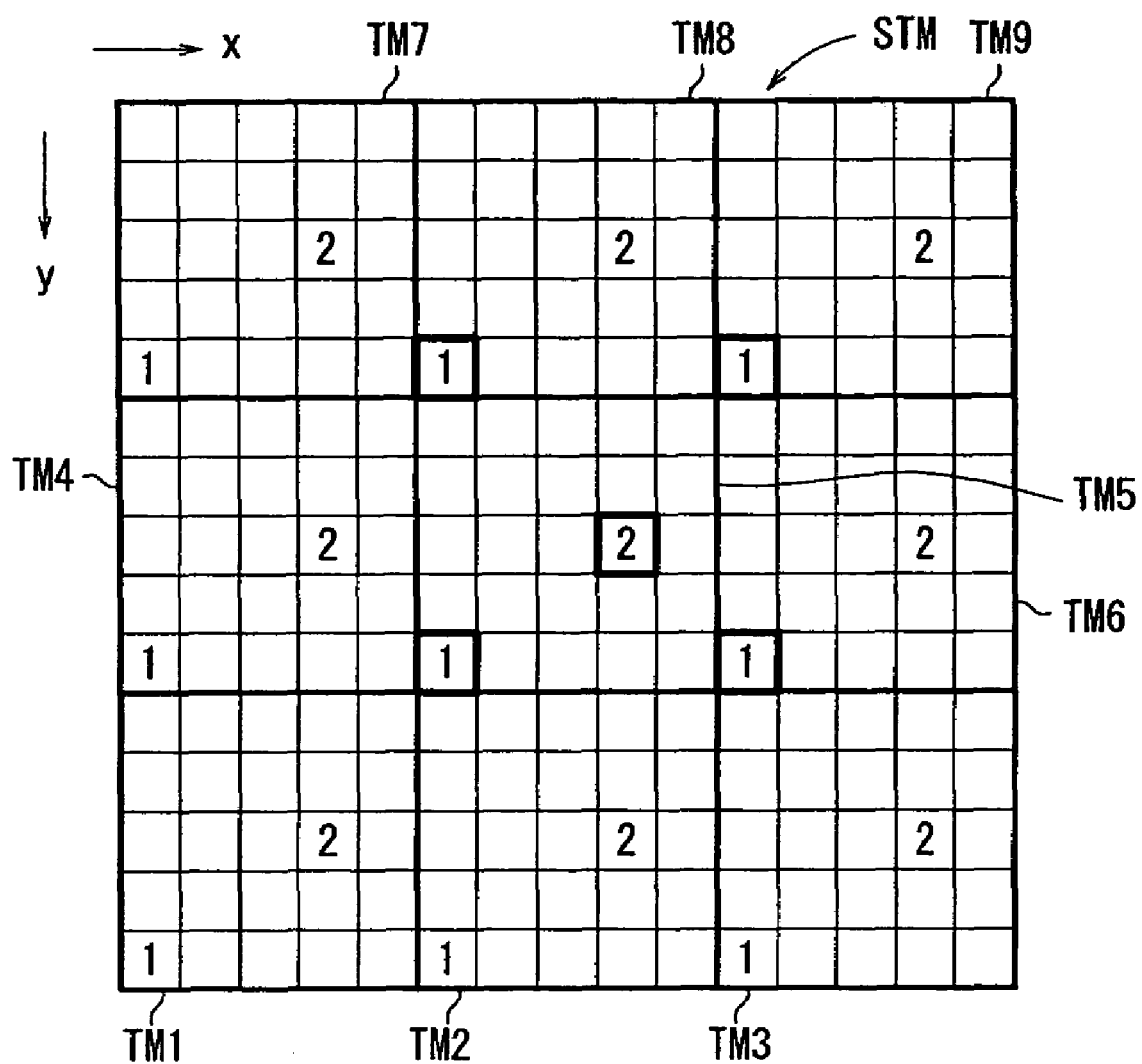
FIG. 15 is a diagram illustrative of a process of determining a threshold position for a next gradation.

In the example shown in FIG. 15, the central threshold "2" in a thick-line frame which is disposed within the threshold matrix TM5 is placed in either a position which contains a point contacted by four circles around respective four thresholds "1" in thick-line frames positioned around the central threshold "2" or a position which is closet to the above position and represents a blackened portion of the binary data A2_bin (see FIG. 3D).

Figure 16A:
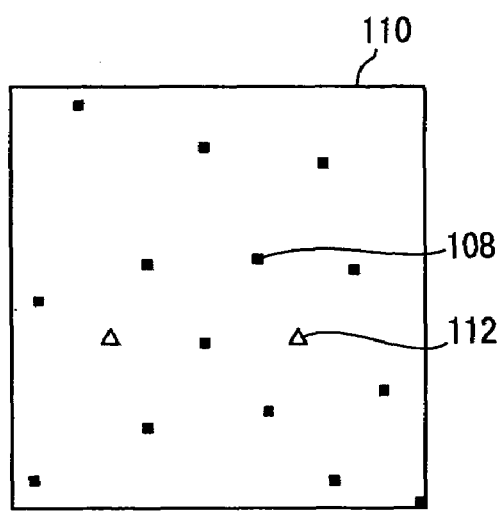
FIG. 16A is a diagram showing threshold candidate positions.

Specifically, as shown in FIG. 16A, positions 112 marked with Δ, for example, in a dot pattern 110 which is made up of dots 108 based on the thresholds th determined up to present are determined as central positions for placing dots.

Then, in step S13, candidates (threshold candidates) th'_hl for positions for placing thresholds are established. In this case, 2×2 (n=4)-pixel dots of a minimum size determined in step S1 around the central positions for placing dots which are determined in step S12 are established (placed), and used as candidates for placing new thresholds, i.e., threshold candidates th'_hl.

Figure 16B:
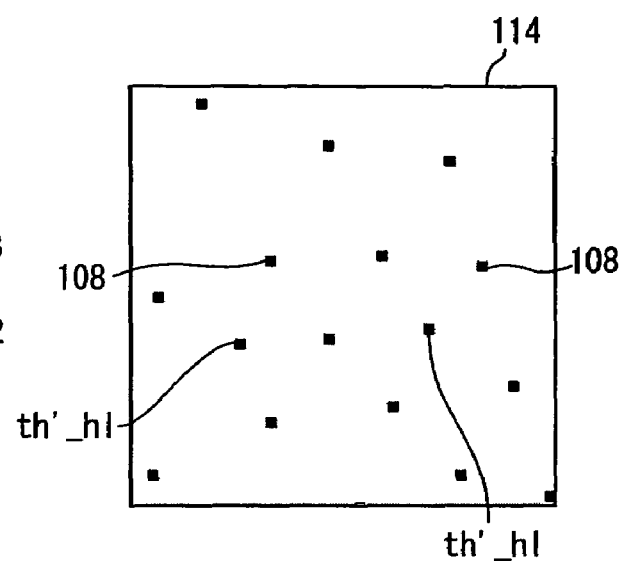
FIG. 16B is a diagram showing smallest-size dots placed in the threshold candidate positions.

Specifically, as shown in FIG. 16B, the threshold candidates th'_hl for the 2×2 (n=4)-pixel dots are set in the dot placing positions 112 marked with Δ in FIG. 16, thus producing a dot pattern 114.

Then, in steps S14 through S16, it is determined whether the total number of pixels of a dot pattern generated by the threshold matrixes TM where the layout of the thresholds th is determined up to present, corresponds to the present dot percentage or not, thereby correcting the total number of pixels. The dot pattern is generated as follows: The image data generator 12 generates continuous-tone image data (image data I for generating a screen tint) of a gray pattern (whose pixel values are the same) corresponding to the dot percentage. The comparator 16 compares the generated continuous-tone image data with the threshold matrixes TM stored in the threshold matrix storage unit 14 and including thresholds up to the threshold th−1 which have been determined up to present. Binary data H produced from the comparator 16 are supplied to the dot pattern generator 18, which produces dot pattern data Ha. A dot pattern based on the dot pattern data Ha is displayed on the display unit 20b or the like.

In step S14, it is determined whether a present pixel count th_hl_total which is the sum of the total number of pixels based on the thresholds 0 through th−1 whose placement positions have already been determined and the total number of pixels based on newly established threshold candidates th'_hl, is smaller than a required pixel count th_hl_num=N×N×th/thmax required at the present dot percentage or not (th_hl_total<th_hl_num).

If the present pixel count th_hl_total is smaller than the required pixel count th_hl_num, then since it is necessary to add as many pixels as the difference (th_hl_num−th_hl_total) which is produced by subtracting the present pixel count th_hl_total from the required pixel count th_hl_num, new threshold candidates th' are established as dots for adding those pixels from the dots that are not based on the existing thresholds 0 through th−1 or the dots that are not based on the newly established threshold candidates th'_hl whose placement positions have not yet been determined in step S15.

If the present pixel count th_hl_total is greater than the required pixel count th_hl_num, then since it is necessary to delete as many pixels as the difference (the present pixel count th_hl_total−the required pixel count th_hl_num), dots for deleting those pixels are selected and deleted from the dots based on the newly established threshold candidates th'_hl in step S16.

In step S16, of the dots making up the dot pattern, several dots may possibly be smaller than dots of a minimum size. In the present embodiment, because the dots of a minimum size are 2×2-pixel dots, the total number of pixels of the dot pattern which is made up of the dots of a minimum size is a multiple of 4. If the total number of dots is adjusted in order to equalize dot percentages, 3-pixel dots, 2-pixel dots, or 1-pixel dots, which are produced by deleting one, two, or three pixels from each of 2×2-pixel dots, may be necessary.

In step S15, as disclosed in Japanese Laid-Open Patent Publication No. 2001-292317, a dot pattern (binary image data) in the spatial domain, which is made up of the dots based on the thresholds 0 through th−1 whose placement positions have already been determined and the dots based on the newly established threshold candidates th'_hl is FFTed into a dot pattern in the frequency domain by the FFT unit 32, after which high frequencies in the dot pattern are cut off by an LPF (Low-Pass Filter) 40. Then, the dot pattern is IFFTed back into a dot pattern in the spatial domain by the IFFT unit 36, after which low-frequency components are extracted from the dot pattern. Positions where the extracted low-frequency components are weakest are set to threshold candidates th' to be added. However, if a dot pattern having a dot percentage of 50% is established in step S2, then positions where the low-frequency components are weakest within blackened pixels of the dot pattern having the dot percentage of 50% may be set to threshold candidates th' to be added.

A process of extracting positions where low-frequency components are weakest will be described below in greater detail. When a dot pattern is FFTed into a dot pattern in the frequency domain, since frequency components present in the repetitive frequency of the threshold matrix TM are noise components (low-frequency components), the dot pattern is filtered by the LPF 40 to extract the low-frequency components.

Since the noise components are perceived by the human being, the low-frequency components are extracted by a human visual characteristic filter 42, used as the LPF 40, which has a sensitivity level of 0 at a spatial frequency of 0 c/mm, a maximum sensitivity level of 1 in the vicinity of a spatial frequency of 0.8 c/mm, a sensitivity level of about 0.4 at a spatial frequency of 2 c/mm, and a sensitivity level of about 0 at a spatial frequency in the range from 6 to 8 c/mm. A model of human visual frequency characteristics is described in detail in "Design of minimum visual modulation halftone patterns" written by J. Sullivan, L. Ray, and R. Miller, IEEE Trans. Syst. Man Cybern., vol. 21, No. 1, 33-38 (1991).

Then, the low-frequency components extracted by the LPF 40 are IFFTed into low-frequency components in the spatial domain by the IFFT unit 36. Because the produced low-frequency components have intensity variations, an image made up of these low-frequency components and the positions of the threshold candidates th' in the threshold matrix TM are compared with each other, and positions where the low-frequency components are weakest (the values are smallest) are set to threshold candidates th'_hl.

In the shadow area SD, positions where the low-frequency components are strongest (the values are greatest) may be set to threshold candidates th'_sd.

In step S16, low-frequency components may similarly be extracted, and pixels may be deleted from dots in positions where the low-frequency components are strongest (the values are greatest), of the new threshold candidates th'_hl. In the shadow area SD, pixels may be deleted from dots based on the new thresholds th'_sd in positions where the low-frequency components are weakest (the values are smallest).

Figure 17B:
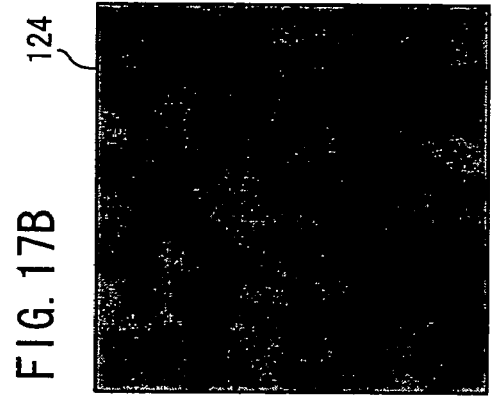
FIG. 17B is a diagram showing a pattern with stressed dark and light areas which is produced by processing the dot pattern shown in FIG. 17A with a visual characteristic filter.
Figure 17D:
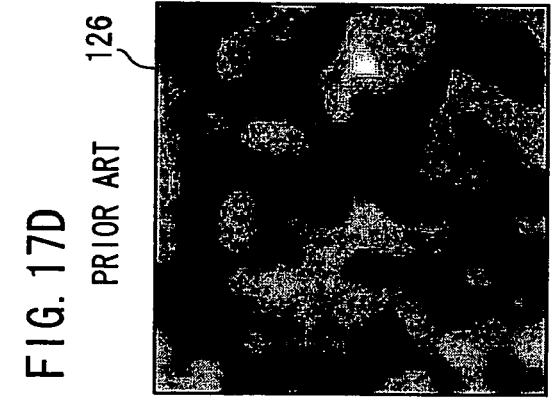
FIG. 17D is a diagram showing a pattern with stressed dark and light areas which is produced by processing the dot pattern shown in FIG. 17C with a visual characteristic filter.
Figure 17A:
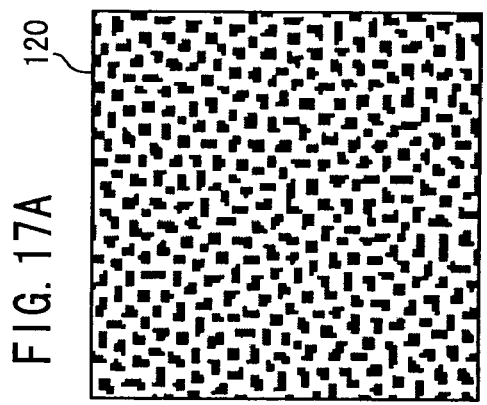
FIG. 17A is a diagram showing a dot pattern having 2×2-pixel dots of a minimum size and a dot percentage of 30%.
Figure 17C:
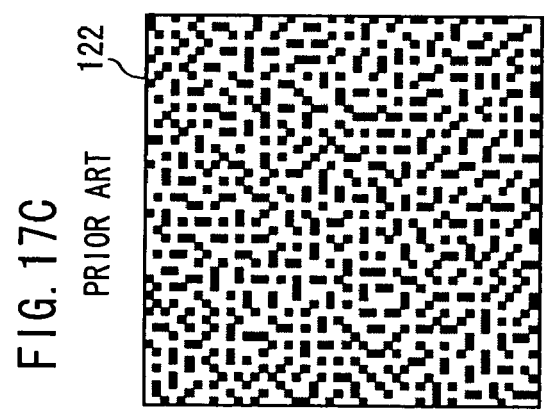
FIG. 17C is a diagram showing a dot pattern of a conventional 2×2-pixel dot FM screen.

FIG. 17A shows a dot pattern 120 having a dot percentage of 30% where the dots of a minimum size are 2×2-pixel dots, according to the present embodiment, the dot pattern 120 being generated by the above process. FIG. 17C shows a dot pattern 122 of the conventional 2×2-pixel dot FM screen.

Figure 18B:
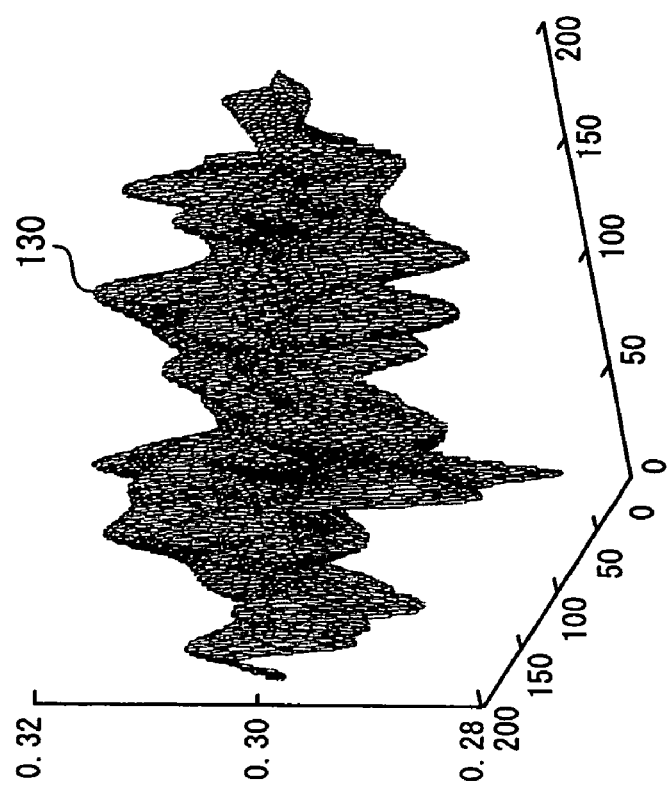
FIG. 18B is a perspective view of the pattern of dark and light areas shown in FIG. 17D.
Figure 18A:
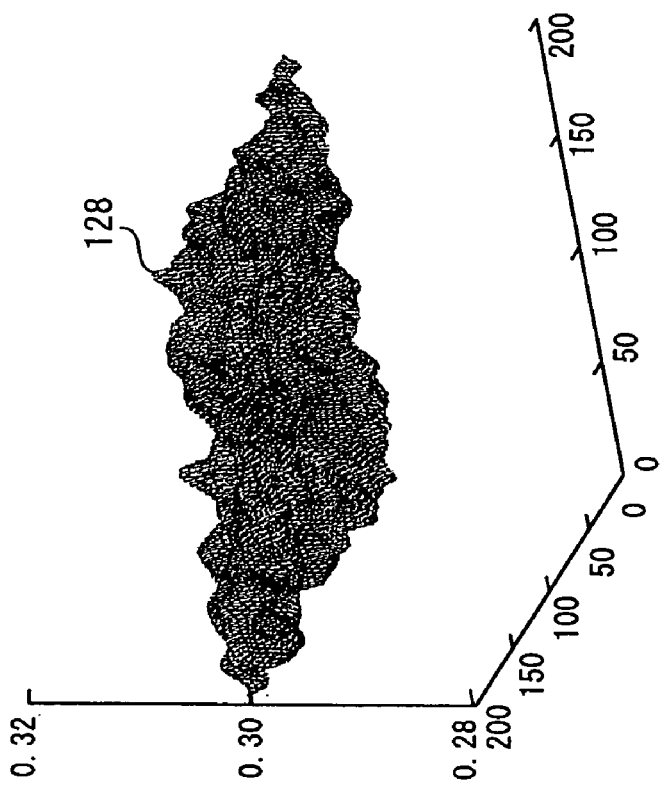
FIG. 18A is a perspective view of the pattern of dark and light areas shown in FIG. 17B.

FIGS. 17B and 17D show dot patterns 124, 126, respectively, with dark and light areas which are produced by processing the dot patterns 120, 122 with the visual characteristic filter 42 used as the LPF 40. FIGS. 18A and 18B show in perspective respective patterns 128, 130 which represent the dot patterns 124, 126 with dark and light areas. In FIGS. 18A and 18B, the vertical axis represents dot percentages with white at 0, black at 1.0, and the dot percentage of 30% at 0.30, and the horizontal axes represent pixels. It can be seen that the dot pattern 120 shown in FIG. 17A according to the present embodiment has smaller intensity variations in the dark and light areas and hence smaller amplitudes than the conventional dot pattern 122 shown in FIG. 17C.

In step S15 or S16, as disclosed in Japanese Laid-Open Patent Publication No. 2002-368995, when the dot pattern is IFFTed by the IFFT unit 36 to produce the low-frequency components in the spatial domain, the low-frequency components may further be FFTed by the FFT unit 32, and particular frequency components may be extracted in a descending intensity order by a particular frequency component extractor 44. The extracted particular frequency components may be IFFTed in a descending intensity order to produce images in the spatial domain, and positions where intensity components are weakest, of the positions which do not intensify these images, may be set to threshold candidates th' or threshold candidates th'_hl.

According to the above processing in steps S12 through S16, a predetermined number of thresholds th may be established on the threshold matrix TM corresponding to positions where dots are newly assigned on the dot pattern.

In step S17, the dot pattern generated by the determined thresholds th is optimized. This process of optimizing the dot pattern is not required if a high-quality dot pattern has been generated by the processing up to step S16.

The process of optimizing the dot pattern may be either one or both of the method disclosed in Japanese Patent No. 3400316 and the process disclosed in Japanese Laid-Open Patent Publication No. 2002-369005.

Specifically, according to the method disclosed in Japanese Patent No. 3400316, low-frequency components are extracted from the dot pattern generated by the thresholds th_hl. Of the extracted low-frequency components, pixels that are placed in positions where the intensity is strongest and pixels that are placed in positions where the intensity is weakest are switched around such that the former pixels will be white pixels and the latter pixels will be blackened pixels, thereby reducing the intensities of the low-frequency components. The blackened pixels have to be pixels attached to the periphery of dots, i.e., pixels held in contact with the periphery of dots, and the threshold th of the blackened pixels is of value equal to the threshold th of the dots.

According to the process disclosed in Japanese Laid-Open Patent Publication No. 2002-369005, as with the process disclosed in Japanese Laid-Open Patent Publication No. 2002-368995, the dot pattern generated by the thresholds th is FFTed, thereafter filtered by the visual characteristic filter 42 and the LPF 40, and then IFFTed into low-frequency components in the spatial domain. The low-frequency components are FFTed to extract frequency components in a descending intensity order. The extracted particular frequency components are IFFTed in a descending intensity order to produce images in the spatial domain, and pixels in positions where intensity components are weakest, of the positions which do not intensify these images and pixels that are placed in positions where the intensity is weakest are extracted and switched around, thereby reducing the intensities of the low-frequency components. The extracted pixels have to be pixels attached to the periphery of dots, and the threshold th of the blackened pixels is of value equal to the threshold th of the dots.

In the process of extracting low-frequency components in steps S14 through S17, as disclosed in Japanese Laid-Open Patent Publication No. 2002-369005, a density image corresponding to a dot pattern output from an image output apparatus may be simulated, i.e., predicted, by a density image simulator (predictor) 46, and low-frequency components may be extracted from the density image. In this case, a test pattern is actually output from the output system 22, and the density image simulator 46 measures how one dot of the original dot pattern is output on the test pattern with dark and light areas, thereby calculating the dot percentage of a density image close to an actual density image from the dot pattern.

An amount of exposure from the shape of the laser beam used in the output system 22 is integrally calculated, and a density image is predicted from the gamma characteristics of the photosensitive material on the printing plate materials EM.

The prediction of a density image based on calculations will be described in detail below. A simulation shape for computer calculations of a laser beam for forming 1×1-pixel dots, 2×2-pixel dots, . . . on a recording medium such as a film F or the like is determined. The laser beam has a shape close to the Gaussian distribution which can substantially be expressed using a beam diameter that is determined by the maximum value $1/e^2$ of the amplitude. The amount of exposure for each dot is calculated from the laser beam and the dot pattern.

Then, the amounts of exposure for the respective dots, i.e., 1×1-pixel dots, 2×2-pixel dots, . . . are converted into densities of the dots using the exposure characteristics, i.e., the gamma characteristics, of the photosensitive material such as a film or the like. A density image (density-simulated image) is obtained from the densities of the dots thus determined. Low-frequency components can be extracted from the density image according to the above process using FFT. Actually, low-frequency components that are extracted from a density image can often be more effective to remove noise components, rather than low-frequency components extracted from a dot pattern.

In this manner, the positions of thresholds th_hl in the threshold matrix are determined.

Then, in step S18, the newly established thresholds th_hl are set to thresholds th_hl+1 for the next gradation (th_hl=th_hl+1).

Similarly, thresholds th_sd for the shadow area SD are determined in steps S22 through S28.

In step S29, the thresholds th_hl determined from the highlight area HL and the thresholds th_sd determined from the shadow area SD are compared with each other for magnitude, and thresholds th_hl and thresholds th_sd are determined until they are of the same value, i.e., until the dot percentage of 50% is achieved. When thresholds th_hl and thresholds th_sd are of the same value, the generation of the threshold matrix is finished.

FIGS. 19A through 19F show dot patterns 131 through 135, 137, respectively, which are part of dot patterns having dot percentages of 10%, 20%, 30%, 40%, 50%, and 70% that are finally generated by dot pattern generator 18 by comparing the thus generated threshold matrix TM with continuous-tone image data of gray patterns having corresponding dot percentages with the comparator 16.

The dot pattern 137 having the dot percentage of 70% may be a pattern that is generated by reversing the white and black areas of the dot pattern 133 having the dot percentage of 30%, or an independently generated pattern.

The dot patterns 131 through 135, 137 shown in FIGS. 19A through 19F are generated by selecting the dot-and-dash-line curve nb which represents the accumulated value of the number of new dots in FIG. 4. The dot pattern 131 having the dot percentage of 10% is made up of only 2×2-pixel dots of a minimum size. The dot pattern 132 having the dot percentage of 20% include a reduced proportion of 2×2-pixel dots of a minimum size and pixels (including 4-through 12-pixel dots) corresponding to the dot percentage that are attached to the periphery of the existing dots (2×2-pixel dots). In dot percentages from 25% to 30%, dots of a minimum size are not newly assigned, but pixels are attached to the existing dots, thereby increasing the blackened ratio. In dot percentages of 35% and higher, more dots of a minimum size are newly assigned.

Since the newly assigned dots serve to forcibly join adjacent dots, the junctions between the dots can be distributed. With the above settings, it is possible to generate a threshold matrix TM capable of generating a dot pattern for smoothly reproducing gradations.

According to the above embodiment, as described above, dots of a minimum size, each made up of a certain number of pixels (one or more pixels), are determined for a highlight area, and a pattern frequency r in the intermediate tone of a dot pattern is determined (step S1). Based on the pattern frequency r, candidate positions for the dots are determined (step S2). Then, the number Dc of new dots of a minimum size is established at each dot percentage (step S3). Under the limitations of the number Dc of new dots of a minimum size and the pattern frequency r in the intermediate tone, thresholds th for generating optimum dot patterns at respective dot percentages are successively generated (step S4). In this manner, a threshold matrix TM optimum for the output system 22 can be generated. The threshold matrix TM optimum for the output system 22 means a threshold matrix TM which is capable of generating an image where dots are reliably and solidly assigned to a highlight area, and graininess is reduced and a dot gain is small in an intermediate tone area, for example.

In the above embodiment, when the output system 22 has an output resolution R pixels/mm and when dot pattern data Ha generated from continuous-tone image data I whose pixel values correspond to a dot percentage P of 50% as binary data H have a pattern frequency r c/mm, a threshold matrix TM having a matrix size of N×M pixels (including the case where N=M) for converting a continuous-tone image into a dot pattern representing a binary image has a certain threshold array. The threshold array makes it possible to generate dot pattern data Ha where dots of a minimum size which are made up of n pixels (n is at least 1) are provided out of contact with each other when the dot percentage P increases from 0% to a value where the number of dots corresponding to the pattern frequency r becomes nearly $N \times M/(R/r)^2$. Also, the threshold array makes it possible to generate dot pattern data Ha where pixels are attached to the periphery of the existing dots of a minimum size and the number of dots is not increased for dot percentages P after the number of dots corresponding to the pattern frequency r becomes nearly $N \times M/(R/r)^2$.

In the dot percentages P after the number of dots corresponding to the pattern frequency r becomes nearly $N \times M/(R/r)^2$, the threshold matrix TM has the dot areas adjusted by attaching pixels to the periphery of the existing dots of a minimum size.

In the above description, only one printing plate (i.e., for one color) has been described. For reproducing color images, however, it is customary to employ a 7-color printing process including separated C, M, Y, K colors (printing plates) and R, G, B colors (printing plates), or a 6-color printing process including C, M, Y, K colors, G color, and orange color. Though different threshold matrixes having m threshold matrix sizes may be generated with respect to m (m>4) colors, any interference between complementary colors is small as dot percentages for complementary colors are hardly increased. Therefore, a threshold matrix for a color may also be used for its complementary color. For example, when inks of C, M, Y, K colors and R, G, B colors are used, one threshold matrix may be used for M and G printing plates, one threshold matrix for C and R printing plates, and one threshold matrix for Y and B printing plates. Similarly, when inks of C, M, Y, K colors, G color, and orange color are used, one threshold matrix may be used for M and G printing plates, and one threshold matrix for C and orange printing plates.

Figure 20:
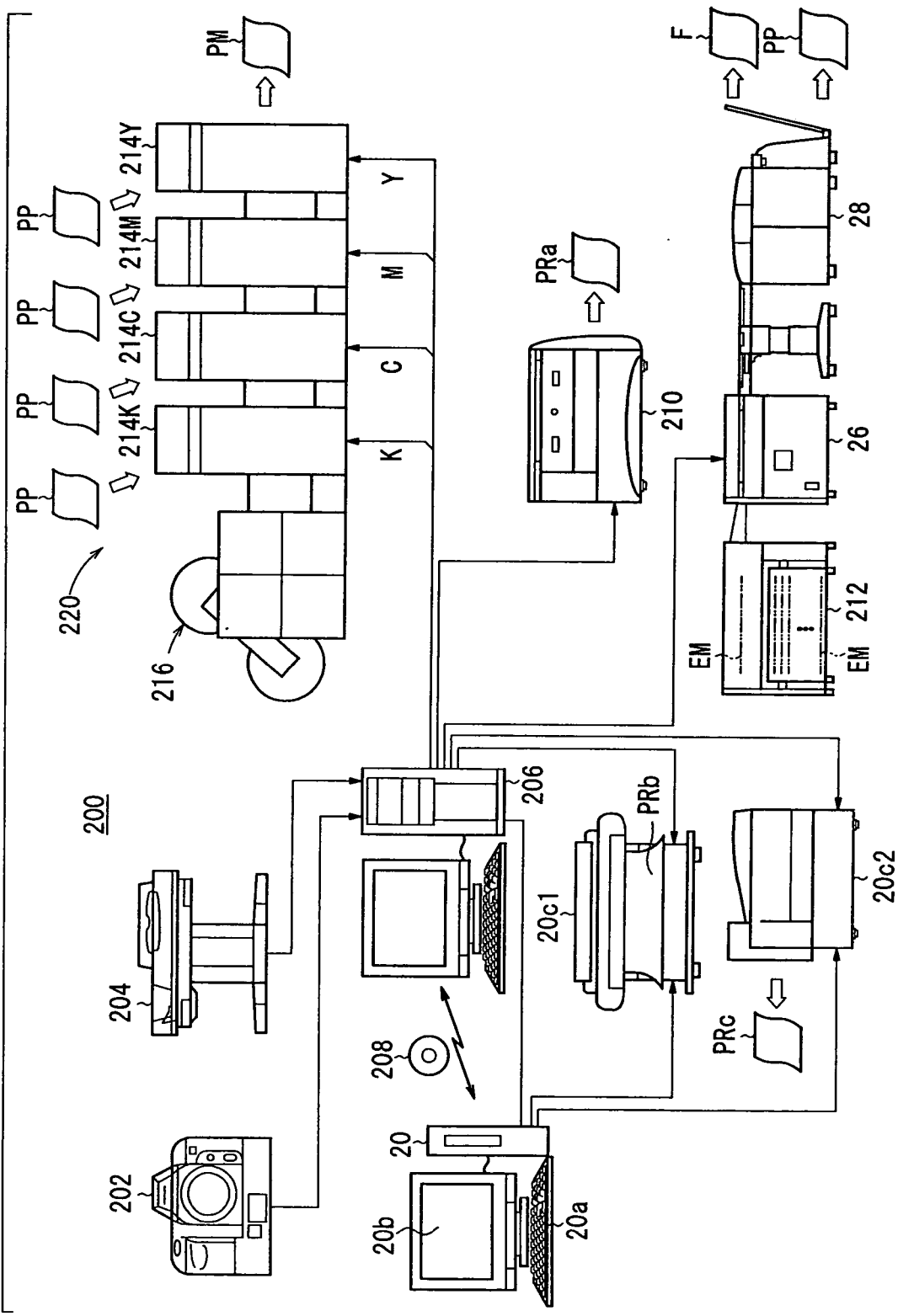
FIG. 20 is a block diagram of a printing/platemaking system incorporating threshold matrixes generated by a threshold matrix generating apparatus.

Threshold matrixes thus generated may be used as follows:

FIG. 20 shows a printing/platemaking system 200 incorporating threshold matrixes generated by the threshold matrix generating apparatus 20 of the threshold matrix generating system 10 shown in FIG. 1.

In the printing/platemaking system 200, RGB image data captured by a digital camera 202 as an image capturing unit or RGB image data (or CMYK image data) read by a plate input machine 204 as a scanner (image reader) are supplied to an RIP (Raster Image Processor) 206, which converts the RGB image data into CMYK image data.

The RIP 206 stores in its storage unit such as a hard disk or the like data of threshold matrixes TM (threshold matrix data) generated by the threshold matrix generating apparatus 20 and supplied through an optical disk 208 serving as a storage unit such as a CD-R or the like or through a communication link.

The RIP 206 compares the CMYK image data and the corresponding CMYK threshold matrix data with each other, and converts the CMYK image data into CMYK dot pattern data (CMYK image data).

The CMYK dot pattern data are then sent to a DDCP (Direct Digital Color Proofer) 210, which produces a print proof PRa on a sheet of paper. The DDCP 210 allows the operator to confirm noise components and printing quality on the print proof PRa before the image data are processed by a printing press 220. The sheet of paper used by the DDCP 210 may be a sheet of printing paper used by the printing press 220.

The RIP 206 delivers the CMYK dot pattern data to a color ink jet printer 20c1 which produces a printing proof PRb on a sheet of paper or a color electrophotographic printer 20c2 which produces a printing proof PRc on a sheet of paper.

The CMYK dot pattern data are also sent to the exposure unit 26 which serves as a filmsetter or a platesetter in the output system 22 such as a CTC apparatus or the like. If the exposure unit 26 is a filmsetter, the automatic developing machine 28 generates a film F. The film F is superposed on a printing plate material, and exposed to light by a planar exposure unit (not shown), producing a printing plate PP. If the exposure unit 26 is a platesetter as shown in FIG. 1, then the automatic developing machine 28 directly outputs a printing plate PP. The exposure unit 26 is supplied with printing plate materials EM from a magazine 212 of photosensitive materials (including plate materials).

CMYK printing plates PP are mounted on plate cylinders (not shown) in a K-plate printer 214K, a C-plate printer 214C, an M-plate printer 214M, and a Y-plate printer 214Y of the printing press 220. In the K-plate printer 214K, the C-plate printer 214C, the M-plate printer 214M, and the Y-plate printer 214Y, the CMYK printing plates PP are pressed against a sheet of printing paper supplied from a printing paper supply unit 216 to transfer the inks to the sheet of printing paper, thereby producing a printed material PM on which a color image is reproduced. If the printing press 220 is configured as a CTC apparatus, then the RIP 206 supplies the CMYK dot pattern data directly through a communication link, and the printing plates mounted on the plate cylinders are exposed to record image data and then developed directly into printing plates PP.

Although certain preferred embodiments of the present invention have been shown and described in detail, it should be understood that various changes and modifications may be made therein without departing from the scope of the appended claims.

What is claimed is:

1. A method of generating a threshold matrix for converting a continuous-tone image into a dot pattern representing a binary image, the method comprising the steps of:

defining a reference periphery length proportion per unit area of the dot pattern as $Ref\_sur = (4 \times r \times Q^{1/2})/R$ where r represents a pattern frequency, Q represents a blackened ratio, and R represents an output resolution;

determining a periphery length proportion per unit area for the dot pattern generated by the threshold matrix corresponding to the blackened ratio Q as Mes_sur;

defining a dot pattern periphery length evaluation index as Mes_sur/Ref_sur; and determining a threshold array of the threshold matrix such that the dot pattern periphery length evaluation index is small.

2. A method according to claim 1, wherein the threshold array of the threshold matrix is determined such that the dot pattern periphery length evaluation index is less than 1.085 for all blackened ratios Q ranging from 0 to 1.

3. A method of generating a threshold matrix for converting a continuous-tone image into a dot pattern representing a binary image, the method comprising the step of:

determining a threshold array of the threshold matrix such that a variation of periphery length ratios of a dot pattern in a main scanning direction is small.

4. A method according to claim 3, wherein the threshold array of the threshold matrix is determined such that a standard deviation of the peripheral length ratios of the dot pattern in the main scanning direction is less than 0.019 for all blackened ratios Q ranging from 0 to 1.

5. A computer readable medium having stored therein a threshold matrix, said computer readable medium containing computer executable instructions for:

causing the threshold matrix to convert a continuous-tone image into a dot pattern representing a binary image, wherein when a reference periphery length proportion per unit area of the dot pattern is defined as $Ref\_sur = (4 \times r \times Q^{1/2})/R$ where r represents a pattern frequency, Q represents a blackened ratio, and R represents an output resolution, a periphery length proportion determined per unit area for the dot pattern generated by the threshold matrix corresponding to the blackened ratio Q is represented by Mes_sur, a threshold array of the threshold matrix is determined such that a dot pattern periphery length evaluation index defined as Mes_sur/Ref_sur is less than 1.085 for all blackened ratios Q ranging from 0 to 1.

6. A computer readable medium having stored therein a threshold matrix, said computer readable medium containing computer executable instructions for:

causing the threshold matrix to convert a continuous-tone image into a dot pattern representing a binary image, wherein a threshold array of the threshold matrix is determined such that a standard deviation of peripheral length ratios of the dot pattern in the main scanning direction is less than 0.019 for all blackened ratios Q ranging from 0 to 1.

7. A method of generating a threshold matrix for converting a continuous-tone image into a dot pattern representing a binary image, the method comprising the steps of:

defining a reference periphery length proportion per unit area of the dot pattern as $Ref\_sur = (4 \times r \times Q^{1/2})/R$ where r represents a pattern frequency, Q represents a blackened ratio, and R represents an output resolution;

determining a periphery length proportion per unit area for the dot pattern generated by the threshold matrix corresponding to the blackened ratio Q as Mes_sur;

defining a dot pattern periphery length evaluation index as Mes_sur/Ref_sur; and determining a threshold array of the threshold matrix such that the dot pattern periphery length evaluation index is small and that a variation of periphery length ratios of the dot pattern in a main scanning direction is small.

8. A method of reproducing a color image by at least four dot patterns, each of the dot patterns comprising a binary image, at least one of the dot patterns being obtained by using a threshold matrix to convert a continuous-tone image into a dot pattern representative of a binary image, wherein when a reference periphery length proportion per unit area of the dot pattern is defined as $Ref\_sur=(4\times r\times Q^{1/2})/R$ where r represents a pattern frequency, Q represents a blackened ratio, and R represents an output resolution, a periphery length proportion determined per unit area for the dot pattern generated by the threshold matrix corresponding to the blackened ratio Q is represented by Mes_sur, and a threshold array of the threshold matrix is determined such that a dot pattern periphery length evaluation index defined as Mes_sur/Ref_sur is less than 1.085 for all blackened ratios Q ranging from 0 to 1.

9. A method of reproducing a color image by at least four dot patterns, each of the dot patterns comprising a binary image, at least one of the dot patterns being obtained by using a threshold matrix to convert a continuous-tone image into a dot pattern representative of a binary image, wherein a threshold array of the threshold matrix is determined such that a standard deviation of peripheral length ratios of the dot pattern in a main scanning direction is less than 0.019 for all blackened ratios Q ranging from 0 to 1.

10. A threshold matrix generating system, comprising:

a threshold matrix generating apparatus which generates a threshold matrix for converting a continuous-tone image into a dot pattern representing a binary image, wherein when a reference periphery length proportion per unit area of the dot pattern is defined as $Ref\_sur=(4\times r\times Q1/2)/R$ where r represents a pattern frequency, Q represents a blackened ratio, and R represents an output resolution, a periphery length proportion determined per unit area for the dot pattern generated by the threshold matrix corresponding to the blackened ratio Q is represented by Mes_sur, a threshold array of the threshold matrix is determined such that a dot pattern periphery length evaluation index defined as Mes_sur/Ref_sur is less than 1.085 for all blackened ratios Q ranging from 0 to 1; and an output system.

11. A threshold matrix generating system, comprising:

a threshold matrix generating apparatus which generates a threshold matrix for converting a continuous-tone image into a dot pattern representing a binary image, wherein a threshold array of the threshold matrix is determined such that a standard deviation of peripheral length ratios of the dot pattern in the main scanning direction is less than 0.019 for all blackened ratios Q ranging from 0 to 1; and an output system.

* * * * *